(12) United States Patent
Sexton et al.

(10) Patent No.: US 10,223,073 B2
(45) Date of Patent: Mar. 5, 2019

(54) RADIX 16 PD TABLE IMPLEMENTED WITH A RADIX 4 PD TABLE

(71) Applicant: Samsung Electronics Co., Ltd., Gyeonggi-do (KR)

(72) Inventors: Bonnie Collett Sexton, Austin, TX (US); James T. Longino, Austin, TX (US)

(73) Assignee: Samsung Electronics Co., Ltd (KR)

( * ) Notice: Subject to any disclaimer, the term of this patent is extended or adjusted under 35 U.S.C. 154(b) by 34 days.

(21) Appl. No.: 15/431,323

(22) Filed: Feb. 13, 2017

(65) Prior Publication Data

US 2018/0121164 A1 May 3, 2018

Related U.S. Application Data

(60) Provisional application No. 62/416,846, filed on Nov. 3, 2016, provisional application No. 62/416,842, filed on Nov. 3, 2016.

(51) Int. Cl.

| | | |
|---|---|---|
| *G06F 7/552* | (2006.01) | |
| *G06F 7/48* | (2006.01) | |
| *G06F 17/17* | (2006.01) | |
| *G06F 7/49* | (2006.01) | |
| *G06F 7/535* | (2006.01) | |

(52) U.S. Cl.
CPC ............ *G06F 7/552* (2013.01); *G06F 7/4824* (2013.01); *G06F 7/49* (2013.01); *G06F 7/535* (2013.01); *G06F 17/17* (2013.01); *G06F 2207/48* (2013.01); *G06F 2207/552* (2013.01)

(58) Field of Classification Search
CPC .......... G06F 7/552; G06F 7/4824; G06F 7/49; G06F 7/535; G06F 17/17
USPC ................................................... 708/650–656
See application file for complete search history.

(56) References Cited

U.S. PATENT DOCUMENTS

| | | | |
|---|---|---|---|
| 4,939,686 A | | 7/1990 | Fandrianto |
| 4,949,295 A | * | 8/1990 | Stearns .................... G06F 7/535 708/504 |
| 5,128,891 A | | 7/1992 | Lynch et al. |
| 5,132,925 A | | 7/1992 | Kehl et al. |
| 5,258,944 A | | 11/1993 | Smith |

(Continued)

OTHER PUBLICATIONS

Wang, A radix-16 combined complex division/square root unit with operand prescaling, IEEE Transactions on Computers, vol. 61, No. 9, Sep. 2012, pp. 1243-1255.

(Continued)

*Primary Examiner* — Tan V Mai
(74) *Attorney, Agent, or Firm* — The Farrell Law Firm, P.C.

(57) ABSTRACT

Apparatuses and methods of manufacturing same, systems, and methods for performing recursive operations using a partial remainder-divisor (PD) table are described. In one aspect, it is determined whether a current cell in the PD table indicated by a current partial remainder/radicand row value and a current divisor/root column value is outside a primary region of the PD table. If the current cell is outside the primary region of the PD table, at least one of the current partial remainder/radicand row value and the current divisor/ root column value are adjusted so that the indicated current cell falls within the primary region of the PD table.

20 Claims, 8 Drawing Sheets

(56) References Cited

U.S. PATENT DOCUMENTS

| | | | |
|---|---|---|---|
| 5,696,712 | A | 12/1997 | Prabhu et al. |
| 5,798,955 | A | 8/1998 | Matsubara |
| 5,862,059 | A | 1/1999 | Matula et al. |
| 5,910,910 | A | 6/1999 | Steele, Jr. |
| 5,954,789 | A | 9/1999 | Yu et al. |
| 6,108,682 | A | 8/2000 | Matheny |
| 6,311,261 | B1 | 10/2001 | Chamdani et al. |
| 6,782,405 | B1 | 8/2004 | Matula et al. |
| 6,847,985 | B1 | 1/2005 | Gupta et al. |
| 7,016,930 | B2 | 3/2006 | Hinds et al. |
| 7,039,666 | B2 | 5/2006 | Kurd |
| 7,127,483 | B2 | 10/2006 | Beaumont-Smith et al. |
| 7,167,887 | B2 | 1/2007 | Kurd |
| 7,167,891 | B2 | 1/2007 | Tang et al. |
| 7,185,040 | B2 | 2/2007 | Lee |
| 7,543,008 | B1 | 6/2009 | Matula et al. |
| 7,809,784 | B2 | 10/2010 | Lee |
| 7,921,149 | B2 | 4/2011 | Uesugi |
| 8,868,633 | B2 | 10/2014 | Lemonds et al. |
| 8,898,215 | B2 | 11/2014 | Amin et al. |
| 8,954,485 | B2 | 2/2015 | Carlough et al. |
| 9,348,796 | B2 | 5/2016 | Kroener et al. |
| 2014/0067889 | A1 | 3/2014 | Mortensen |
| 2016/0147503 | A1 | 5/2016 | Burgess et al. |
| 2016/0328207 | A1 | 11/2016 | Sexton |
| 2017/0017467 | A1 | 1/2017 | Sexton |

OTHER PUBLICATIONS

Nannarelli, Radix-16 combined division and square root unit, 2011 20th IEEE Symposium on Computer Arithmetic, Technical Univ. of Denmark, Kongens Lyngby, Denmark, pp. 169-176.

Ercegovac, M. et al., Shared implementation of radix-10 and radix-16 division algorithm with limited precision primitives, 2011 Conference Record of the Forty Fifth Asilomar Conference on Signals, Systems and Computers (ASILOMAR) Year: 2011; pp. 1828-1832.

Nannarelli, Performance/power space exploration for binary64 division units, IEEE Transactions on Computers; May, 2016, vol. 65, Issue: 5; pp. 1671-1677.

Liu, W. et al., Power efficient division and square root unit, IEEE Transactions on Computers, Aug. 2012, vol. 61, Issue: 8; pp. 1059-1070.

Lang, T. et al., Combined radix-10 and radix-16 division unit, 4 2007 Conference Record of the Forty-First Asilomar Conference on Signals, Systems and Computers Year: 2007; pp. 967-971.

Russinoff, Computation and formal verification of SRT quotient and square root digit selection tables, IEEE Trans. on Computers, Year: 2013, vol. 62, Issue: 5 Dept. of Central Verification, Advanced Micro Devices, Inc., Austin, TX, 13 pages.

Lang T. et al., Very-high radix combined division and square root with prescaling and selection by rounding, In arith, p. 124-131, IEEE, 1995.

Oberman, Minimizing the complexity of srt tables, IEEE Transactions on Very Large Scale Integration (VLSI) Systems, vol. 6, No. 1, Mar. 1998, pp. 141-149.

Petkovsek, Contiguous Digit Sets and Local Roundings, IEEE Transactions on Computers, 1989, pp. 136-143.

Pineiro, J. et al., High-radix iterative algorithm for powering computation, 16th IEEE Symposium on Computer Arithmetic, (ARITH'03), 8 pages.

Wang, C. et al., Design of a cycle-efficient 64B/32B integer divider using a table-sharing method, 2001 IEEE Int'l Conference on Electronics, pp. 921-924.

Fandrianto, Algorithm for high speed shared radix 8 division and radix 8 square root, Integrated Information Technology, Inc., Santa Clara, CA, 1989, pp. 68-75.

Fandrianto, Algorithm for high speed shared radix 4 division and radix 4 square root, Weltek Corp., Sunnyvale, CA, May 1987 IEEE, pp. 73-79.

Ercegovac, M. et al., On-the-fly conversion of redundant into conventional representation, IEEE Transactions on Computers, vol. C-36, No. 7, Jul. 1987, pp. 895-897.

Choo, I. et al., An accurate linear approximation method utilizing a bipartite reciprocal table for a floating point divider, IEEE Tx 2001, pp. 1199-1204.

Oberman et al., Design Issues in Division and Other Floating-Point Operations, IEEE Transactions on Computers, vol. 46, No. 2, Feb. 1997, pp. 154-161.

Atkins, Higher-radix division using estimates of the divisor and partial remainders, IEEE Transactions on Computers, vol. C-17, No. 10, Oct. 1968, pp. 925-934.

Antelo, E. et al., Digit-recurrence dividers with reduced logical depth, IEEE Transactions on Computers, vol. 54, No. 7, Jul. 2005, pp. 837-851.

Burgess, N. et al., Design issues in radix-4 SRT square root & divide unit, IEEE 2001, pp. 1646-1650.

\* cited by examiner

RADIX 16 PD TABLE IMPLEMENTED WITH A RADIX 4 PD TABLE

PRIORITY

This application claims priority under 35 U.S.C. § 119(e) to U.S. Prov. Pat. App. Ser. No. 62/416,846 filed on Nov. 3, 2016 and to U.S. Prov. Pat. App. Ser. No. 62/416,842 filed on Nov. 3, 2016, the entire contents of each of which are incorporated herein by reference.

FIELD

The present disclosure relates generally to performing recursive operations using a partial remainder-divisor (PD) table, and more particularly, to reducing the resources needed for storing the PD table.

BACKGROUND

As computer applications grow increasingly complex, hardware architecture is increasingly burdened by the requirements of higher speed and taking up less space, while also trying to avoid becoming unworkably complex. One way to reduce resource usage is to use components and functionalities for multiple uses. The present application considers the sharing of components/functionalities to perform both division and square root calculations. To understand the components/functionalities involved, performing division by computer is first discussed below.

Like most calculations performed by processors, division is implemented as an iterative process. One category of division iterative processes, or algorithms, are digit recurrence algorithms, which use subtraction to obtain the quotient/remainder. "Restoring" digit recurrence algorithms is similar to the iterative process of division by paper and pencil, where it is sometimes required to restore the original dividend by adding the divisor to it. Intuitively, it can be seen this requires a certain amount of memory, and, if dividing two n-digit numbers, can result in 2n additions/subtractions being performed.

"Nonrestoring" digit recurrence algorithms eliminate the restoration cycles, and only require up to n additions. This is accomplished by representing the quotient as a digital set of positive and negative integers, such as, e.g., {−1,+1}, which is converted into binary form. In this way, small errors in one iteration can be corrected in subsequent iterations. Sweeney, Robinson, and Tocher (SRT) division, which is widely used in computing, is a special set of nonrestoring digital recurrence algorithms which use a lookup table (LUT) rather than computing certain iterative calculations. See, e.g., D. Atkins, *Higher-Radix Division Using Estimates of the Divisor and Partial Remainders*, IEEE Transactions on Computers, vol. C-17, No. 10, pp. 925-934 (October 1968), the entire contents of which are incorporated herein by reference.

The recursive/iterative relationship used in division can be represented as shown in Equation (1):

$$p_{j+1} = rp_j - q_{j+1}d \quad (1)$$

where:
j=the recursive index=0, 1, ..., m−1
$p_j$=the partial remainder used in the jth cycle
$p_0$=the dividend
$p_m$=the remainder
$q_j$=the jth quotient digit in which the quotient is in the form:

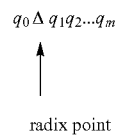

radix point m=the number of digits, radix r, in the quotient
d=the divisor
r=the radix.

The radix r of the algorithm, typically chosen to be a power of 2, determines how many quotient bits are retired in each iteration, such that $r=2^b$. Accordingly, a radix r algorithm requires [n/b] iterations to compute an n digit quotient. Each iteration of the division recurrence comprises the following steps:

1) determine next quotient-digit $q_{j+1}$ by the quotient-digit selection function;
2) generate the product $q_{j+1} \times d$; and
3) subtract $q_{j+1} \times d$ from $r \times p_j$ to form the next partial remainder.

In SRT division, the quotient-digit function in step 1 is implemented by a LUT, known as a partial remainder-divisor (PD) table, as the LUT is based on the partial remainder and the divisor calculated in each iteration. See, e.g., Oberman and Flynn, *Minimizing the Complexity of SRT Tables*, IEEE Transactions of VLSI Systems, vol. 6, no. 1, pp. 141-149 (March 1998) ("Oberman and Flynn 1998"), the entire contents of which are incorporated herein by reference.

The square root function can be similarly implemented by an iterative process, in which the radicand is similar to the dividend, the partial radicand is similar to the partial remainder, and the root is similar in formation to the quotient. See, e.g., J. Fandrianto, *Algorithm for High Speed Shared Radix 4 Division and Radix 4 Square Root*, IEEE Symposium on Computer Arithmetic 1987, pp. 73-79 ("Fandrianto et al. 1987"), and J. Fandrianto, *Algorithm for High Speed Shared Radix 8 Division and Radix 8 Square Root*, IEEE Symposium on Computer Arithmetic 1989, pp. 68-75 ("Fandrianto et al. 1989"), the entire contents of both of which are incorporated herein by reference.

SUMMARY

According to an aspect of the present disclosure, a method of performing recursive operations using a partial remainder-divisor (PD) table in a microprocessor is provided, including determining whether a current cell in the PD table indicated by a current partial remainder/radicand row value and a current divisor/root column value is outside a primary region of the PD table; and, if the current cell is outside the primary region of the PD table, adjusting at least one of the current partial remainder/radicand row value and the current divisor/root column value so that the indicated current cell falls within the primary region of the PD table.

According to an aspect of the present disclosure, an apparatus is provided, including one or more non-transitory computer-readable media which store a partial remainder-divisor (PD) table used in performing recursive operations and at least one processor which, when executing instructions stored on the one or more non-transitory computer readable media for performing recursive operations, performs the steps of determining whether a current cell in the PD table indicated by a current partial remainder/radicand row value and a current divisor/root column value is outside a primary region of the PD table and, if the current cell is outside the primary region of the PD table, adjusting at least one of the current partial remainder/radicand row value and the current divisor/root column value so that the indicated current cell falls within the primary region of the PD table.

According to an aspect of the present disclosure, a method is provided, including manufacturing a chipset including one or more non-transitory computer-readable media which store a partial remainder-divisor (PD) table used in performing recursive operations and at least one processor which, when executing instructions stored on the one or more non-transitory computer readable media for performing recursive operations, performs the steps of determining whether a current cell in the PD table indicated by a current partial remainder/radicand row value and a current divisor/root column value is outside a primary region of the PD table and, if the current cell is outside the primary region of the PD table, adjusting at least one of the current partial remainder/radicand row value and the current divisor/root column value so that the indicated current cell falls within the primary region of the PD table.

According to an aspect of the present disclosure, a method of testing an apparatus is provided, including testing whether the apparatus has one or more non-transitory computer-readable media which store a partial remainder-divisor (PD) table used in performing recursive operations and testing whether the apparatus has at least one processor which, when executing instructions stored on the one or more non-transitory computer readable media for performing recursive operations, performs the steps of determining whether a current cell in the PD table indicated by a current partial remainder/radicand row value and a current divisor/root column value is outside a primary region of the PD table and, if the current cell is outside the primary region of the PD table, adjusting at least one of the current partial remainder/radicand row value and the current divisor/root column value so that the indicated current cell falls within the primary region of the PD table.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
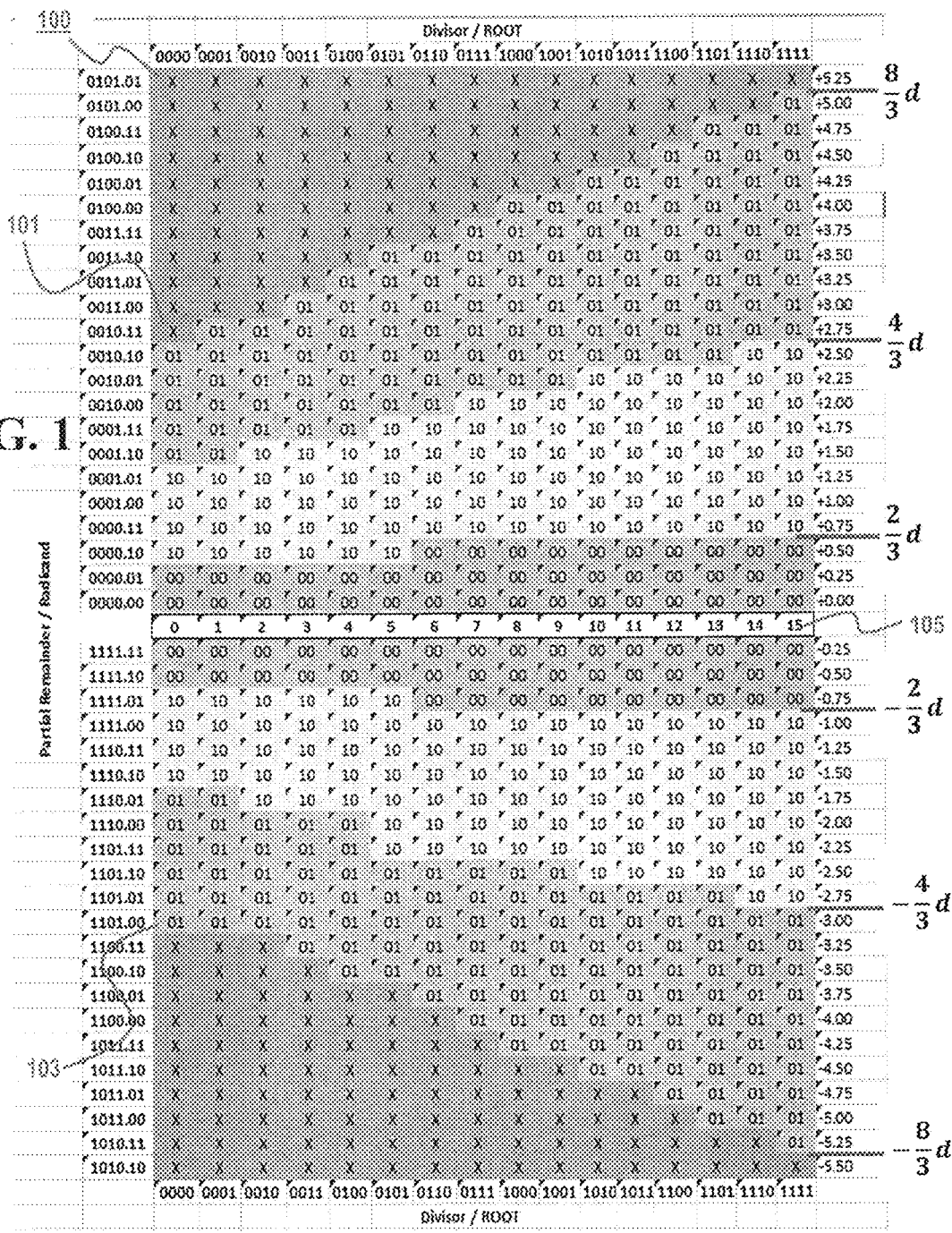
FIG. 1 illustrates a radix-4 PD table used for both square root and division operations according to an embodiment of the present disclosure.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification do not necessarily refer to the same embodiment.

The fundamental method of decreasing the overall latency (in machine cycles) of the SRT algorithm is to increase the radix of the algorithm. By choosing the radix to be a power of two, the product of the radix and the partial remainder can be formed by shifting. Accordingly, only power of two radices are considered herein. Assuming the same quotient precision, the number of iterations of the algorithm required to complete the computation is reduced whenever the radix is increased. For example, a radix-4 algorithm retires 2 bits of quotient in every iteration. Increasing to a radix-16 algorithm will allow for retiring 4 bits in every iteration, for a 2× reduction in latency.

This reduction does not come for free. As the radix increases, the quotient digit selection becomes more complex. Since the quotient-digit selection is typically on the critical path of the algorithm, even though the number of cycles may have been reduced due to the increased radix, the time per cycle may have increased. As a result, the total time required to compute a bit quotient may not be reduced as much as expected. Accordingly, the radix is a fundamental parameter in determining the complexity of the quotient-digit selection table, i.e., the PD table.

According to an embodiment of the present disclosure, radix-16 recursive operations are implemented with a radix-4 PD table, thereby decreasing latency without the increased complexity of a radix-16 PD table. Both square root and division operations are supported by shared hardware. Normally, using a higher radix requires storing a proportionately larger PD table. By maintaining a radix-4 table, systems according to embodiments of the present disclosure maintains a relatively smaller PD size, fewer multiples, and easier square root trailers, as discussed more fully below.

Although not limited thereto, embodiments of the present disclosure are described herein in terms of using 32 bit single precision formatted numbers according to the IEEE-754 standard (which is incorporated by reference herein in its entirety), as shown below:

$$S \quad EEEEEEEE \quad NNNNNNNNNNNNNNNNNNNNNNN \quad (1)$$

BITS: 32 31 . . . 24 23 . . . . . . . . . . . . . . . 1
EX.: 1 10000000 (1). 00000000001000000000000 in which bit 32 is the sign (S), bits 31-24 are the exponent (E), and bits 23-1 are the mantissa, also known as the fraction or significand (N). The fraction/mantissa in the IEEE-754 format has an "invisible" leading bit (i.e., not stored) of value 1.0, as shown by the "(1)" in between the exponent and mantissa above, which means the value of the fraction/mantissa is between 1.0 and 2, and accordingly, bit 23 has a value of ½, bit 22 has a value of ¼, etc. The value of a IEEE-754 32 bit single precision number is sign× $2^{exponent}$×mantissa. Accordingly, the IEEE-754 32 bit single precision number example ("EX.") above corresponds to the value+2.0009766.

However, as would be known to one of ordinary skill in the art, embodiments of the present disclosure may be applied to systems using numbers formatted in 64 bits, 128 bits, etc., or in double precision, etc.

FIG. 1 illustrates a radix-4 PD table 100 according to an embodiment of the present disclosure. A similar radix-4 PD table according to the present disclosure is described in U.S. patent application Ser. No. 14/972,077, entitled "PARTIAL REMAINDER/DIVISOR TABLE SPLIT IMPLEMENTATION" and filed on Dec. 16, 2015 (hereinafter, "the '077 application"), which is incorporated by reference herein in its entirety.

Because the PD table serves both operations (division and square root), the columns may be referred to as columns/roots, columns/divisors, or columns/roots/divisors, and the rows may be referred to as rows/partial remainders, rows/partial radicands, or rows/partial remainders/radicands in the present disclosure. However, most of the examples described herein are division operations, even though embodiments of the present disclosure apply to square root operations as well.

PD tables, which are usually stored as lookup tables (LUTs), are used to generate the quotient estimate in each iteration of the recursive processes by selecting the cell indicated by the column and row of the previous divisor/root and partial remainder/radicand, respectively. The negative binary values in the radix-4 PD table 100 are in "two's complement" format. The radix-4 PD table 100 cannot be "folded" in its present form, meaning that the radix-4 PD table 100 is not perfectly symmetrical around the line 105 between the "positive" zero value row and the first negative value row. In other words, because, for example, a cell 101 on the positive side is a non-value ("X") while a corresponding cell 103 on the negative side is a "01", the radix-4 PD table 100 cannot be folded.

In embodiments of the present disclosure, PD tables are saved in foldable form—or, more exactly, the upper half of a "foldable" PD table is saved in the LUT. Where there is not perfect symmetry (which is always the case), such as at the cells 101 and 103, extra steps/techniques are used to ensure the correct value is given, as discussed below. Other structures, systems, and methods concerning creating and implementing foldable PD tables in a division/square root architecture to which the present disclosure could be applied are described in U.S. patent application Ser. No. 14/996,216, entitled "INTEGER/FLOATING POINT DIVIDER AND SQUARE ROOT LOGIC UNIT AND ASSOCIATED METHODS" and filed on Jan. 14, 2016 (hereinafter, "the '216 application"), which is incorporated by reference herein in its entirety.

As would be understood by one of ordinary skill in the art, the radix-4 PD table 100 is using the minimally redundant quotient digit set {−2, −1, 0, 1, 2} for radix-4 with a Measure of Redundancy (MoR) of 2/3 (=n/(r−1)). Moreover, the boundaries between the quotient digits are the highest possible boundaries, as will be discussed in more detail in reference to Table 2 below. More specifically, the boundary between 0 and +1 is +2/3d and 0 and −1 is −2/3d, where "d" is the divisor/root. Although the divisor/root values for the column values are 0 (0000) though 15 (1111), these should be understood as fractional values between 1 and 2. This is because, as discussed in more detail in reference to FIG. 2 below, the divisor value comprises the first four bit values of the fraction/mantissa of the 32-bit single precision value formatted divisor. Thus, as the fraction/mantissa bits represent values between 1 and 2, the column values in a PD table also represent values between 1 and 2. Accordingly, the d value of column 1001 is actually 1+(the fractional value of binary "1001").

Continuing with the boundaries between the quotient digits in the radix-4 PD table of FIG. 1, the boundary between +1 and +2 is +4/3d and −1 and −2 is −4/3d, and the boundary between +2 and the "don't care" ("X") region is +8/3d and the boundary between −2 and the "don't care" ("X") region is −8/3d. In the radix-4 PD table 100 of FIG. 1, the binary value of "2" is represented by "01" and the binary value of "1" is represented by "10" for convenience and efficiency for implementation in hardware.

As would be known to one of ordinary skill, the minimum number of columns for a radix-4 PD table is 4 columns. See, e.g., Russinoff, David M, Computation and Formal Verification of SRT Quotient and Square Root Digit Selection Tables, *IEEE Transactions of Computers*, vol. 62, issue 5, pp. 900-913 (2013) ("Russinoff 2013"), which is incorporated by reference in its entirety.

However, in accordance with embodiments of the present disclosure, the number of columns of the lower radix PD table which is used for higher radix operations has the minimum number of columns of a PD table of the higher radix. Accordingly, because radix-4 PD table 100 in FIG. 1 is used for radix-16 operations, it has the minimum number of columns for a radix-16 PD table, i.e., 16, according to an embodiment of the present disclosure.

Table 1 below lists the minimally redundant set of quotient digits, the maximally redundant set of quotient digits, the cell size, and minimum number of columns required for PD tables with different radices. Although embodiments of the present disclosure are described herein with minimally redundant digit sets being used, any digit set from and including the minimally redundant quotient set to the maximally redundant quotient set can be used for the lower radix PD table, with appropriate changes in implementation, as would be understood by one of ordinary skill in the art. For example, if a radix-256 PD table was used in accordance with the present disclosure to perform radix-512 division/square root operations, it could have 512 columns, a cell size of 8 bits, and the maximally redundant digit set of {−255, . . . −1, 0, +1, . . . , +255}.

TABLE 1

Parameters for PD Tables with Minimal/Maximal Redundancy

| radix | r | 4 | 8 | 16 | 32 | 64 | 128 | 256 | 512 |
|---|---|---|---|---|---|---|---|---|---|
| multiples | n | 2 | 3 | 4 | 5 | 6 | 7 | 8 | 9 |
| Minimally Redundant Digit Set | {−n, . . . , −1, 0, +1, . . . , +n} | {−2, −1, 0, +1, +2} | {−3, . . . , 0, . . . , +3} | {−4, . . . , 0, . . . , +4} | {−5, . . . , 0, . . . , +5} | {−6, . . . , 0, . . . , +6} | {−7, . . . , 0, . . . , +7} | {−8, . . . , 0, . . . , +8} | {−9, . . . , 0, . . . , +9} |
| Minimum MoR | a!/(r − 1), where a = largest digit | 2/3 | 3/7 | 4/15 | 5/31 | 6/63 | 7/127 | 8/255 | 9/511 |
| Maximally Redundant Digit Set | {−(r − 1), . . . , −1, 0, +1, . . . , +(r − 1)} | {−3, . . . , 0, . . . , +3} | {−7, . . . , 0, . . . , +7} | {−15, . . . , 0, . . . , +15} | {−31, . . . , 0, . . . , +31} | {−63, . . . , 0, . . . , +63} | {−127, . . . , 0, . . . , +127} | {−255, . . . , 0, . . . , +255} | {−511, . . . , 0, . . . , +511} |
| Maximum MoR | a!/(r − 1), where a = largest digit | 1 | 1 | 1 | 1 | 1 | 1 | 1 | 1 |
| Cell size (in bits) | b, where r = $2^b$ | 2 | 3 | 4 | 5 | 6 | 7 | 8 | 9 |
| Min. No. of Columns | r | 4 cols. | 8 cols. | 16 cols. | 32 cols. | 64 cols. | 128 cols. | 256 cols. | 512 cols. |

The difference in size of PD tables as the radix value increases is non-trivial, and can greatly affect the local architecture in a chip. For example, the total number of cells in a minimally redundant radix-4 PD table is 688 (which equals 1,376 bits) and the total number of cells in a minimally redundant radix-16 PD table is 4,064 (which equals 16,256 bits)—an almost 15 times increase in bits needed to be stored.

Although, as discussed above, the boundaries between the different quotient digits in FIG. 1 are set and distinct, with the boundary between 0 and +1 is set at 2/3, the boundary between +1 and +2 set at 4/3, and the upper boundary of +2 set at 8/3, the boundaries of the quotient digits in a raw PD table actually overlap each other in regions where either value may be used. Table 2 below shows the actual upper boundary ($U_k$) and lower boundary ($L_k$) for each digit in the minimally redundant digit set of different radix PD tables.

TABLE 2

Digit Boundaries for Different Radices

| bounds | radix 4 | | radix 8 | | radix 16 | | radix 32 | | radix 64 | |
|---|---|---|---|---|---|---|---|---|---|---|
| | $U_k$ | $L_k$ | $U_k$ | $L_k$ | $U_k$ | $L_k$ | $U_k$ | $L_k$ | $U_k$ | $L_k$ |
| 0 | 2/3 | −2/3 | 3/7 | −3/7 | 4/15 | −4/15 | 5/31 | −5/31 | 2/21 | −2/21 |
| 1 | 5/3 | 1/3 | 10/7 | 4/7 | 19/15 | 11/15 | 36/31 | 26/31 | 23/21 | 19/21 |
| 2 | 8/3 | 4/3 | 17/7 | 11/7 | 11/5 | 8/5 | 67/31 | 57/31 | 44/21 | 40/21 |
| 3 | — | — | 24/7 | 18/7 | 16/5 | 13/5 | 98/31 | 88/31 | 65/21 | 61/21 |
| 4 | — | — | — | — | 21/5 | 18/5 | 129/31 | 119/31 | 86/21 | 82/21 |
| 5 | — | — | — | — | — | — | 160/31 | 150/31 | 107/21 | 103/21 |
| 6 | — | — | — | — | — | — | — | — | 128/21 | 124/21 |
| −1 | −1/3 | −5/3 | −4/7 | −10/7 | −11/15 | −19/15 | −26/31 | −31/31 | −19/21 | −23/21 |
| −2 | −4/3 | −8/3 | −11/7 | −17/7 | −8/5 | −11/5 | −57/31 | −67/31 | −40/21 | −44/21 |
| −3 | — | — | −18/7 | −24/7 | −13/5 | −16/5 | −88/31 | −98/31 | −61/21 | −65/21 |
| −4 | — | — | — | — | −18/5 | −21/5 | −119/31 | −129/31 | −82/21 | −84/21 |
| −5 | — | — | — | — | — | — | −150/31 | −160/31 | −103/21 | −105/21 |
| −6 | — | — | — | — | — | — | — | — | −124/21 | −128/21 |

Although not shown in Table 2, all of the values in the table are actually the coefficients of the column/root/divisor d, so that, for example, the upper and lower boundaries for the value 0 in the radix-4 PD table are 2/3d and −2/3d, respectively ($1^{st}$ row, $1^{st}$ column of Table 2), and 4/15d and −4/15d in the radix-16 PD table ($1^{st}$ row, $2^{nd}$ column in Table 2). Moreover, as the upper boundary of digit 0 is 2/3d and the lower boundary of digit 1 is 1/3d in a radix-4 PD table, it can be seen that the region between 1/3d and 2/3d may be either 1 or 0. Thus, when implementing a PD table, a fixed boundary between 0 and 1 must be selected from the region between 1/3d and 2/3d. In FIG. 1, the boundaries selected are the upper boundaries of the lower number, i.e., the boundary between 0 and 1 is set at 2/3 (the upper boundary of 0), the boundary between 1 and 2 is set at 4/3 (the upper boundary of 1), and the upper boundary of 2 is set at 8/3 (the upper boundary of 2).

Although the boundaries between the different quotient digits in FIG. 1 are set and distinct, at 2/3, 4/3, and 8/3, the present disclosure is not limited thereto, and can be applied to PD tables with different boundaries than those shown in FIG. 1, where those boundaries may fall anywhere within the overlap regions identified in Table 2 above. See, e.g., FIG. 4 of Russinoff 2013 for an example of different boundaries for the minimally redundant quotient set of a radix-4 PD table.

Figure 2:
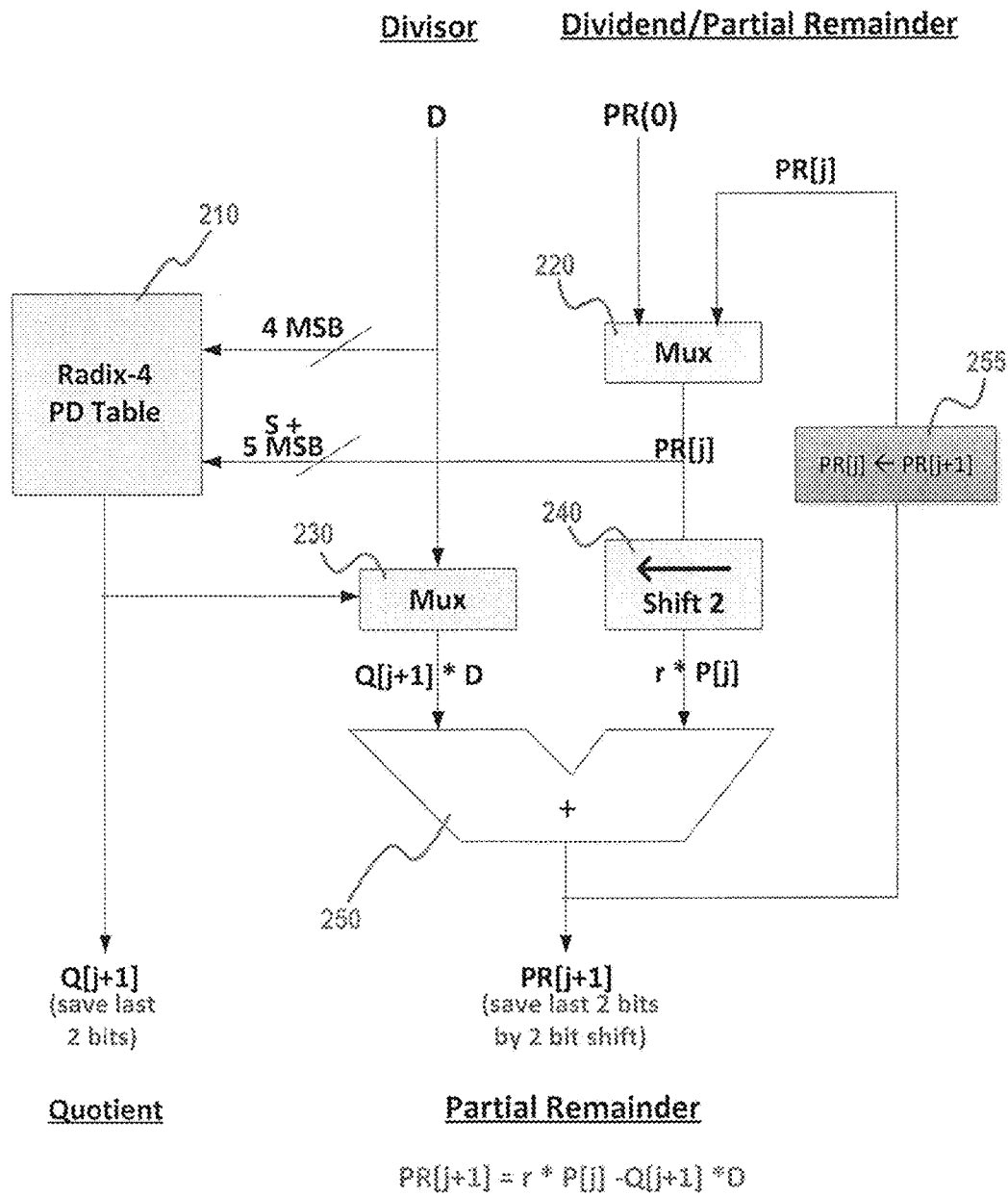
FIG. 2 is a block diagram illustrating an architecture for performing radix-4 division/square root operations according to an embodiment of the present disclosure.

FIG. 2 is a block diagram illustrating an architecture for performing radix-4 division/square root operations according to an embodiment of the present disclosure. Only the elements essential to the present description are shown, and, as would be understood by one of ordinary skill in the art, many more components and operations are needed to perform these calculations in a real world implementation. See, e.g., Oberman, S., and Flynn, M. J., "Design Issues in Division and Other Floating-Point Operations," *IEEE Transactions on Computers*, vol. 46, no. 2, pp. 154-161 (1997), which is hereby incorporated by reference herein in its entirety.

The initial divisor D and dividend PR[0] are shown as input at the top of FIG. 2. The 4 most significant bits (MSBs) of divisor D are input to radix-4 PD table 210. Using the IEEE-754 32 bit precision format, the 4 MSBs are the first four bits of the mantissa/significand ("NNNN"), i.e., bits 23-20, of the divisor D. When input, the 4 MSBs of divisor D are used to select the column in radix-4 PD table 210. The whole value D and its first 4 MSBs of D remain the same through all iterations. However, when performing square root operations, there is no divisor D and, for example, the least significant bit (LSB) of the exponent ("E" bit 24) and the three MSBs of the significand ("N" bits 23-21) may be used as the input to radix-4 PD table 210 instead of the 4 MSBs of divisor D.

Mux 220 selects dividend PR[0] for the first iteration but after that only the partial remainder PR[j] (where j indicates the iteration number) is input and output. Whether PR[j=0] (at the start) or PR[j>0] (while iterating), the sign bit (S) of PR[j] and the first 5 MSBs of PR[j] (using IEEE 32 bit precision format) are input to radix-4 PD table 210. When input, the sign bit (S) and first 5 MSBs of PR[j] are used to select the row in radix-4 PD table 210. The values of the sign bit (S) and first 5 MSBs of PR[j] may change at each iteration.

Accordingly, in an embodiment using the radix-4 PD table 100 in FIG. 1 as radix-4 PD table 210, if the 4 MSBs of divisor D were "0111", and the sign bit (S) and the 5 MSBs of the partial remainder PR[j] were "001000", the output, i.e., Q[j+1], would be "10". As shown in FIG. 1, when sign bit S is 1, the value is negative, and the binary value is given in two's complement format. According to embodiments of the present disclosure, only the folded and modified form of the radix-4 PD table is stored in order to save space.

Mux 230 takes the Q[j+1] output from the radix-4 PD table 210 and the divisor D in order to output Q[j+1]×D, which, in turn, is input to carry-save-adder (CSA) 250. The partial remainder PR[j] (or of the initial dividend PR[0] in the first iteration) output from Mux 220 is shifted by 2 bits at 240. Being shifted by two in binary is equivalent to multiplying by 4, which is the radix. Accordingly, the output of 240 is the multiplication r×P[j], which is also input to CSA 250. As would be understood by one of ordinary skill in the art, CSA 250 outputs PR[j+1] in accordance with Equation (1) above.

Like long-hand division, only some of the partial remainder is retained for the next iteration. In a radix-4 operation, two bits are saved per iteration (even though PR[j] remains in its full value). After partial remainder PR[j+1] is output, it becomes the PR[j] input of the next iteration as shown by box 255 in FIG. 2. The loops continue until either PR[j+1]=0 or all of the bit values are filled.

Figure 3A:
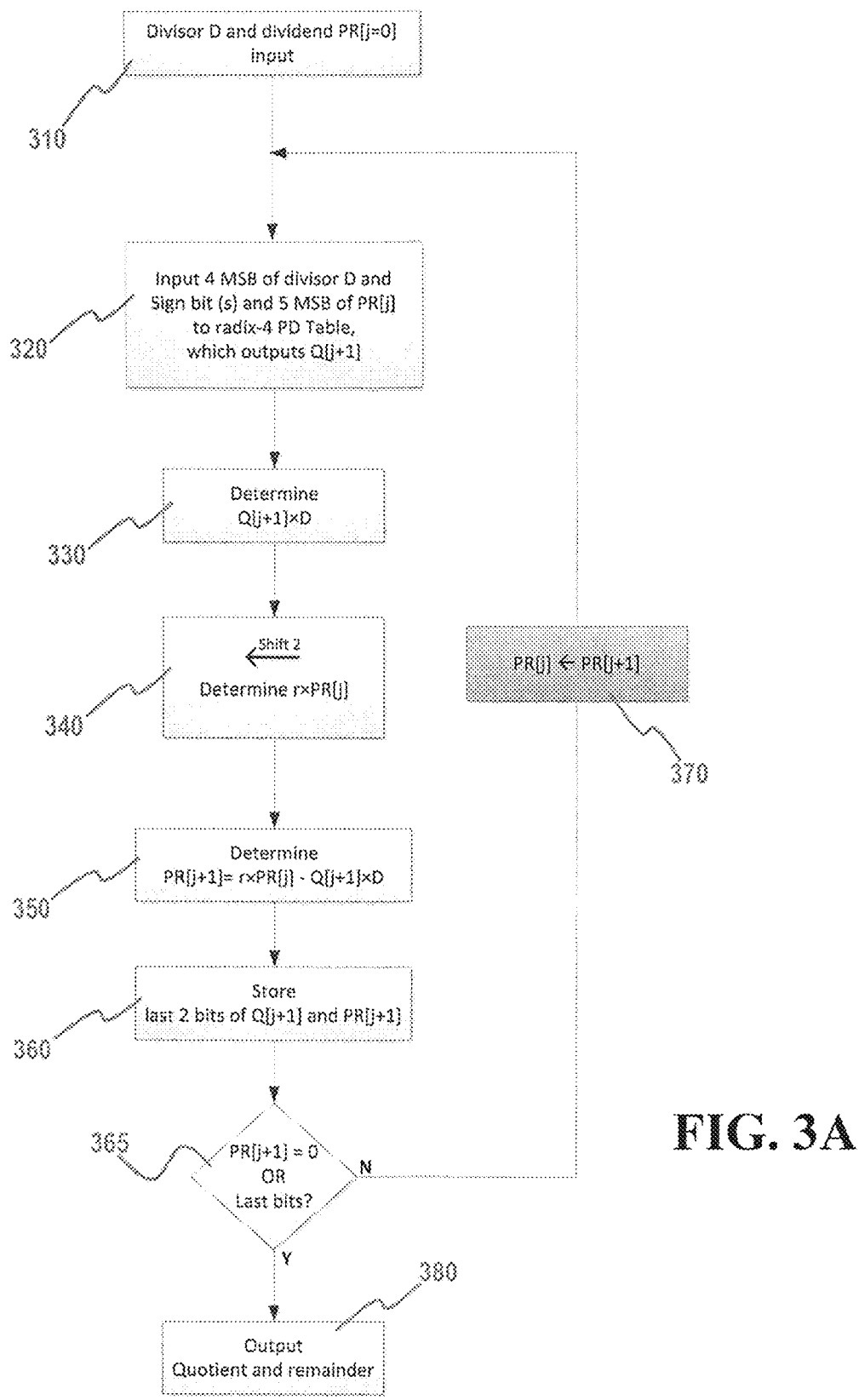
FIG. 3A is a flowchart illustrating a method for performing radix-4 division operations according to an embodiment of the present invention.

FIG. 3A is a flowchart illustrating a method for performing radix-4 division operations according to an embodiment of the present invention. The flowchart in FIG. 3A is for illustration purposes only, and the steps shown therein may be performed simultaneously, in a different order, or by indirect means (e.g., using equations that achieve the same final result).

At 310, the divisor D and initial dividend PR[j=0] are input. At 320, the 4 MSBs of divisor D are input as a column value to the radix-4 PD table, and the sign bit (S) and 5 MSBs of the partial remainder PR[j] (or of the initial dividend PR[j=0] in the first iteration) are input as the row value of the radix-4 PD table. The cell/entry indicated in the radix-4 PD table by the 4 MSBs of divisor D and the S+5 MSBs of the partial remainder PR[j] (or of the initial dividend PR[j=0] in the first iteration) is output as Q[j+1]. As mentioned above, when performing square root operations, there is no divisor D and, for example, the least significant bit (LSB) of the exponent ("E" bit 24) and the three MSBs of the significand ("N" bits 23-21) may be used as the input to the radix-4 PD table instead of the 4 MSBs of divisor D.

At 330, Q[j+1]×D is determined and at 340, r×PR[j] is determined by, as discussed above, shifting PR[j] by two bits. At 350, the partial remainder is calculated, i.e., PR[j+1]=r×PR[j]−Q[j+1]×D. The last two bits of Q[j+1] and PR[j+1] are stored in 360. AT 365, it is determined whether the calculation is finished. More specifically it is determined whether the current partial remainder is 0 (PR[j+1]=0) or all of the bits of the number have been calculated. If the current partial remainder is 0 (PR[j+1]=0) or all of the bits of the number have been calculated, the final answer is output, i.e., the calculated quotient and remainder, at 380.

On the other hand, if the current partial remainder is not 0 (PR[j+1]#0) and all of the bits of the number have not been calculated in 365, the iterations continue. More specifically, the output partial remainder PR[j+1] becomes the PR[j] for the next iteration at 370, as indicated by the loop back up above 320 in FIG. 3A.

Figure 3B:
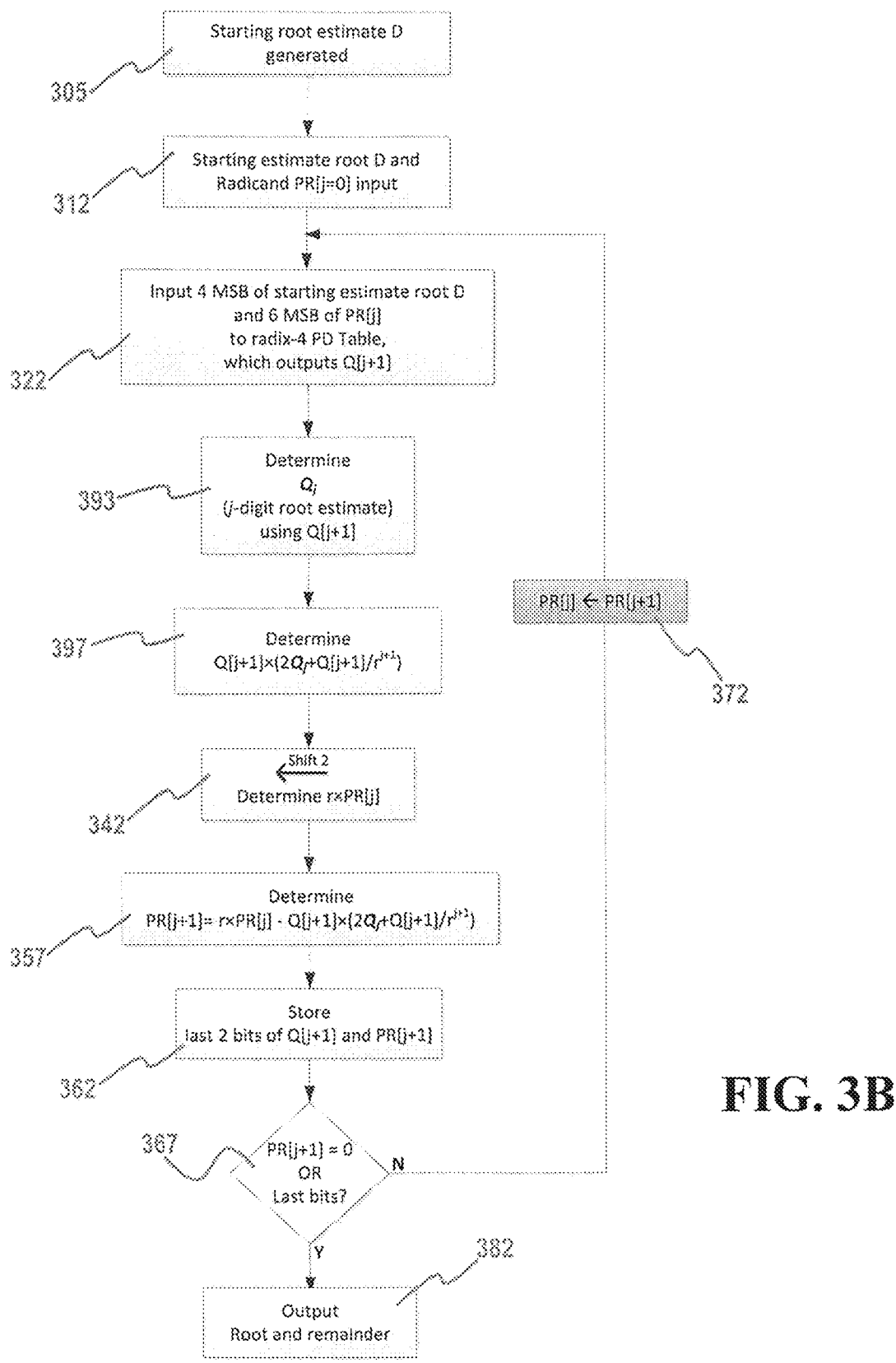
FIG. 3B is a flowchart illustrating a method for performing radix-4 square root operations according to an embodiment of the present invention.

FIG. 3B is a flowchart illustrating a method for performing radix-4 square root operations according to an embodiment of the present invention. The flowchart in FIG. 3B is for illustration purposes only, and the steps shown therein may be performed simultaneously, in a different order, or by indirect means (e.g., using equations that achieve the same final result).

Although based on Equation (1), the recursive equation for the SRT square root operation can be represented more specifically as shown in Equation (2):

$$p_{j+1} = rp_j - q_{j+1}\left(2Q_j + \frac{q_{j+1}}{r^{j+1}}\right) \quad (2)$$

where:
j=the recursive index=0, 1, . . . , m−1
$p_j$=the partial radicand used in the jth iteration
$p_0$=the radicand
$q_j$=the jth root digit in which the root is in the form:

$$q_0 \underset{\underset{\text{radix point}}{\uparrow}}{\triangle} q_1 q_2 \cdots q_m$$

m=the number of digits, radix r, in the root
$Q_j$=the j-digit result in the jth iteration (may be in vector form)
r=the radix.[1]

[1] See, e.g., Fandrianto et al. 1987, Fandrianto et al. 1989, and Burgess, N., and Hinds, C., *Design issues in radix-4 SRTsquare root & divide unit*, 2001 ASILOMAR Conference on Signals, Systems, and Computers, vol. 2, pp. 1646-1650 ("Burgess and Hinds 2001"), the entire contents of which are incorporated herein by reference.

As mentioned above, and shown above, when performing square root operations, there is no equivalent to the beginning value divisor D in the division operations and thus a starting root estimate needs to be generated. One procedure for generating the starting root estimate is described in related U.S. patent application Ser. No. 15/419,757 (hereinafter, "the '757 application"), entitled "HIGH RADIX 16 SQUARE ROOT ESTIMATE" and filed on Jan. 30, 2017, which is hereby incorporated by reference in its entirety.

At 305 in this embodiment, the least significant bit (LSB) of the exponent ("E" bit 24) and the three MSBs of the significand ("N" bits 23-21) of the starting radicand value PR[j=0] is used to generate the starting root estimate input, as described in the '757 application.

At 312, the starting root estimate D and initial radicand PR[j=O] are input. At 322, the 4 MSBs of starting root estimate D are input as a column value to the radix-4 PD table, and the 6 MSBs of the partial radicand PR[j] (or of the starting radicand PR[j=0] in the first iteration) are input as the row value of the radix-4 PD table. The cell/entry indicated in the radix-4 PD table by the 4 MSBs of starting root estimate D and the 6 MSBs of the partial radicand PR[j] (or of the initial radicand PR[j=0] in the first iteration) is output as Q[j+1].

At 393, the complete j-digit root estimate $Q_j$ is determined using Q[j+1]. This may be done via an on-the-fly (OTF) memory/table, such as is described in the '216 application. For more details regarding implementing an OTF, see also, e.g., Ercegovac, M., and Lang, T., "Alternative On-the-Fly Conversion of Redundant into Conventional Representations," *IEEE Transactions on Computers*, vol. C-36, no. 7, pp. 895-897 (July 1987) ("Ercegovac and Lang 1987"). Depending on the details of the implementation, both the $Q_j$ vector and its complement may be generated. At 397, Q[j+1]×(2$Q_j$+Q[j+1]/$r^{j+1}$), sometimes referred to as the "root multiple," is determined.

At 342, r×PR[j] is determined by, as discussed above, shifting PR[j] by two bits.

At 357, the partial radicand is calculated, i.e., PR[j+1]=r×PR[j]−Q[j+1]×(2$Q_j$+Q[j+1]/$r^{j+1}$). The last two bits of Q[j+1] and PR[j+1] are stored in 362. AT 367, it is determined whether the calculation is finished. More specifically, it is determined whether the current partial radicand is 0

(PR[j+I]=0) or all of the bits of the number have been calculated. If the current partial radicand is 0 (PR[j+1]=0) or all of the bits of the number have been calculated, the final answer is output, i.e., the calculated root and remainder at 382.

On the other hand, if the current partial radicand is not 0 (PR[j+1]≠0) and all of the bits of the number have not been calculated in 367, the iterations continue. More specifically, the output partial radicand PR[j+1] becomes the PR[j] for the next iteration at 372, as indicated by the loop back up above 322 in FIG. 3B.

Figure 4:
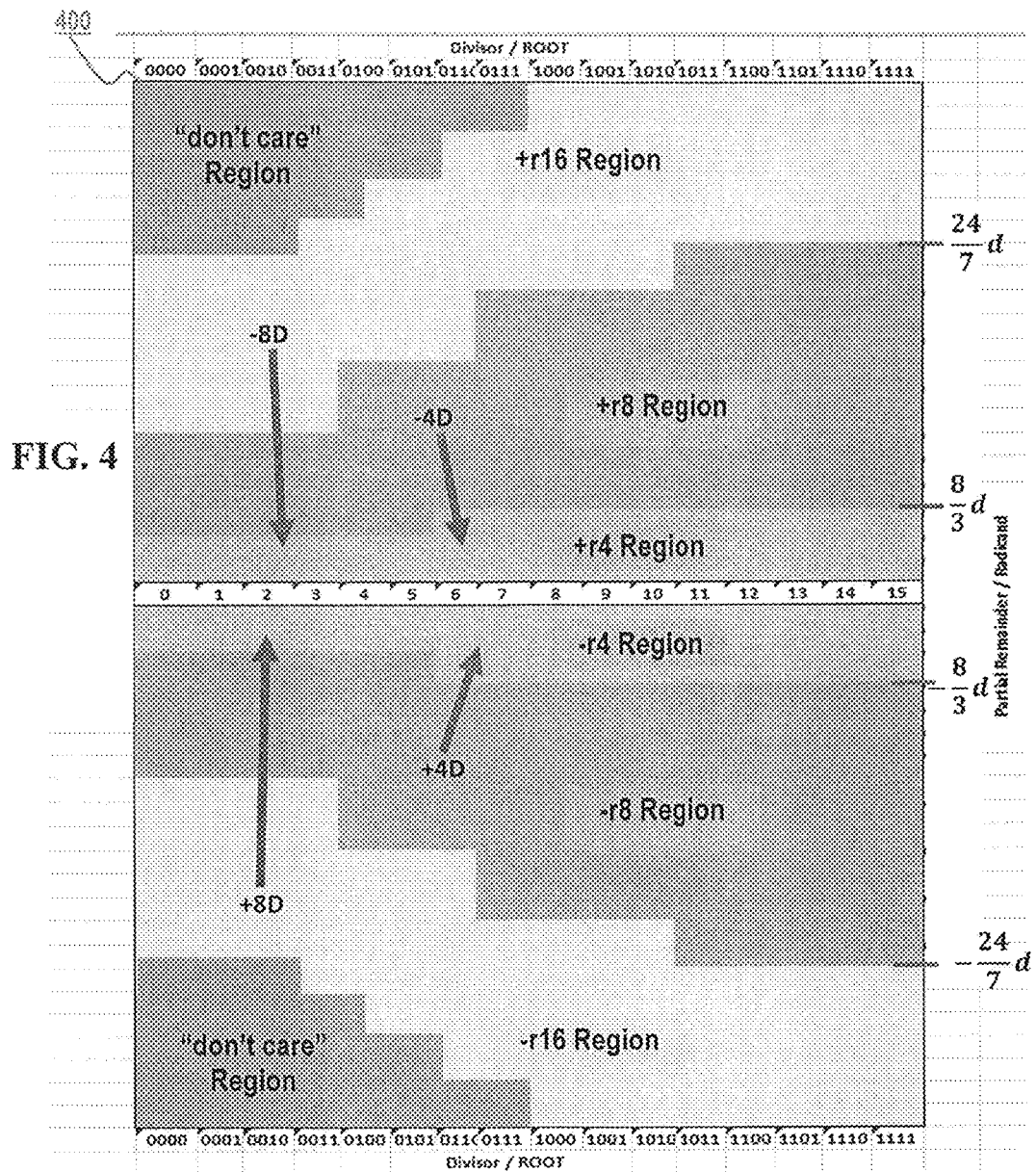
FIG. 4 illustrates the regions in a radix-16 PD table, where the values for most of the corresponding cells/entries are not stored according to an embodiment of the present disclosure.

FIG. 4 illustrates a radix-16 PD table 400, the cell/entry values for most of which are not stored according to an embodiment of the present disclosure, where the regions illustrated correspond to a radix-4 PD table, a radix-8 PD table, and a radix-16 PD table. More specifically, the +r4 region and −r4 region (jointly, the "+/−r4 region") correspond to the positive and negative parts of radix-4 PD table 100 in FIG. 1, modified to be symmetric, i.e., foldable. When used in the radix-16 environment, the two-bit entries shown in the radix-4 PD table 100 (the +/−r4 region) are translated into four bits, as discussed in further detail below. FIG. 4 is not drawn to scale. The "don't care" regions are also illustrated, showing where some of the cell/entries with impermissible values are located.

As the +/−r4 region corresponds to a modified form of the radix-4 PD table 100 in FIG. 1, the remaining can be seen as expansions to larger size PD tables. From that viewpoint, the +/−r8 region corresponds to the expansion required for a radix-8 PD table and the +/−r16 region corresponds to the expansion required for a radix-16 PD table. In embodiments of the present disclosure, the cell/entries for the +/−r8 and +/−r16 regions are not stored, and the radix-4 PD table (the +/−r4 region) is used in determining all cell/entry values in radix-16 division/square root operations.

According to an embodiment of the present disclosure, when a value falls in the +/−r8 and +/−r16 regions, that value is reduced over one or more cycles to a value of an entry/cell in the +/−r4 region. In this manner, only the cell values of the +/−r4 region (i.e., a modified form of the radix-4 PD table 100 in FIG. 1) need to be kept in one or more LUTs, and the range of values in the other regions are defined only by their boundaries. Accordingly, a radix-4 PD table such as a radix-4 PD table 100 (in modified form) can be used to represent the cell values for a full radix-16 PD table as represented by the radix-16 PD table 400 in FIG. 4. Moreover, since the radix-4 PD table region can also be modified to be foldable, only the +r4 region in FIG. 4 needs to have the full values of its cell/entries stored in one or more LUTs. See, e.g., the '077 application for more details regarding folding.

As mentioned above, when used in the radix-16 environment, the two-bit entries shown in the radix-4 PD table 100 (the +/−r4 region) are stored as four bits by appending "00" before each entry.

Because of the necessary reduction in overall size (the full-size radix-16 PD table has 4064 entries) to fit a letter-size page, FIG. 4 does not accurately represent the exact boundaries between regions. In fact, the boundaries are all ragged/stepped and are defined as indicated by the outer markings on the right-hand side of FIG. 4, i.e., +/−8/3 between +/−r4 region and the +/−r8 region and +/−24/7 between the +/−r8 region and the +/−r16 region. Thus, in order to obtain the positive upper boundary of the +r4 region, multiply the column/divisor/root value d by 8/3 in each column. Similarly, for the positive upper boundary of +r8 region, multiply the column/divisor/root value d by 24/7 in each column. To obtain each step/column on the negative side, the same procedure is used with negative values. The upper boundary of the radix-16 PD table is not shown as it approaches a "don't care" zone where the values are the same or discarded. Of course, in a radix-32 or radix-512 implementation, those boundaries would need to be defined as well.

Figure 5:
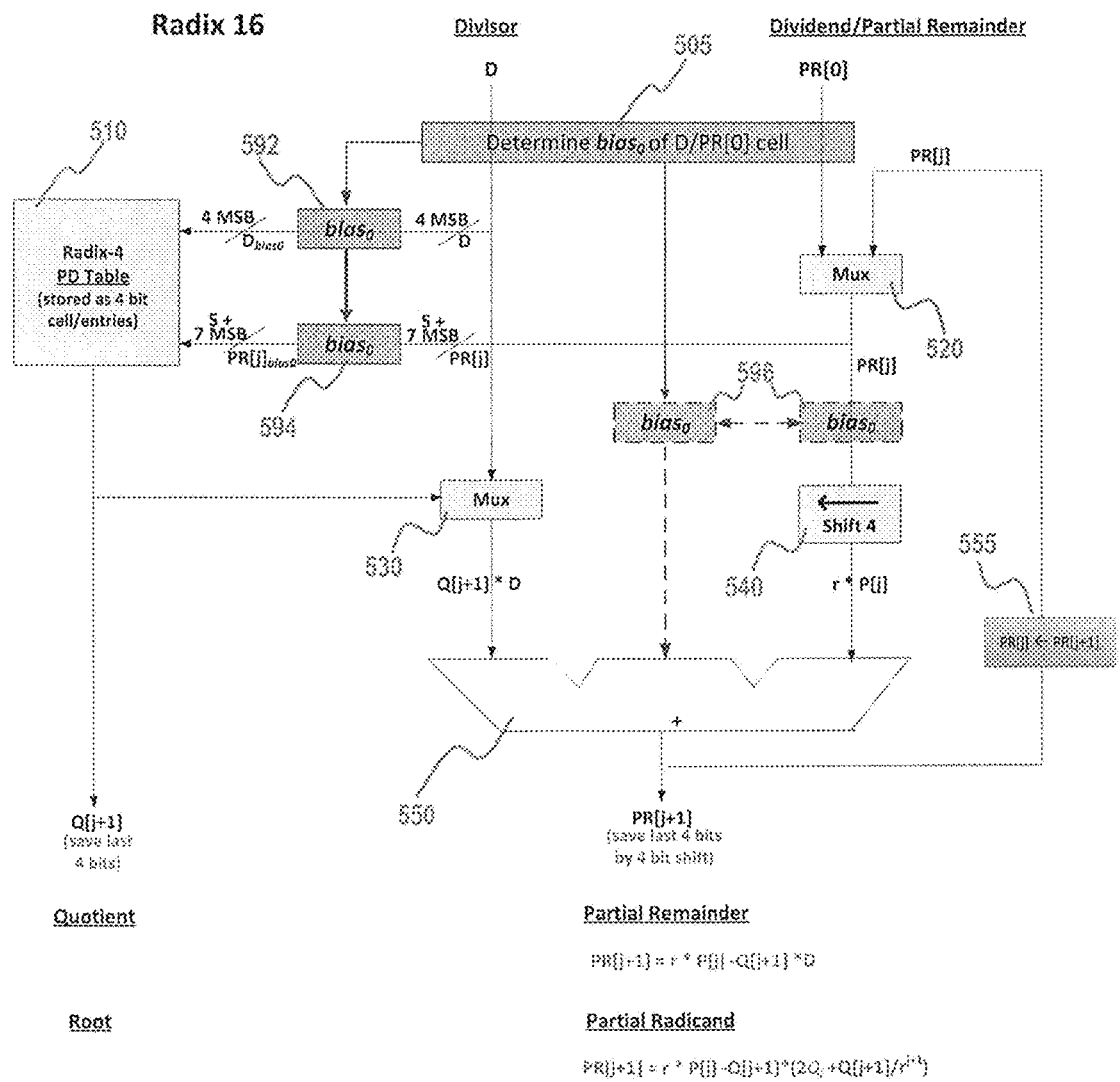
FIG. 5 is a block diagram illustrating an architecture for performing radix-16 division/square root operations using a radix-4 PD table according to an embodiment of the present disclosure.

FIG. 5 is a block diagram illustrating an architecture for performing radix-16 division/square root operations using a radix-4 PD table according to an embodiment of the present disclosure. Only the elements essential to the present description are shown, and, as would be understood by one of ordinary skill in the art, many more components and operations are needed to perform these calculations in a real world implementation. For example, the separate carry and save lines for the PR, any OTF memory/table, the $Q_j$ vector, etc., are not shown, as all of these components may be implemented in a number of ways in accordance with the present disclosure, as would be understood by one of ordinary skill in the art. For more such details, see, e.g., the '077 application; the '216 application; Oberman and Flynn 1998; Ercegovac and Lang 1987; Burgess and Hinds 2001; Wang, D. and Ercegovac, M., "A Radix-16 Combined Complex Division/Square Root Unit with Operand Prescaling," *IEEE Transactions on Computers*, vol. 61, no. 9, pp. 1243-1255 (September 2012); Antelo, E., et al., "Digit-Recurrence Dividers with Reduced Logical Depth," *IEEE Transactions on Computers*, vol. 54, no. 7, pp. 837-851 (July 2005); Lang, T., and Montuschi, P., "Very High Radix Square Root with Prescaling and Rounding and a Combined Division/Square Root Unit," *IEEE Transactions on Computers*, vol. 48, no. 8, pp. 827-841 (August 1999); Liu, W., and Nannarelli, A., "Power Efficient Division and Square Root Unit," *IEEE Transactions on Computers*, vol. 61, no. 8, pp. 1059-1070 (August 2012); Nannarelli, A., "Performance/Power Space Exploration for Binary64 Division Units," *IEEE Transactions on Computers*, vol. 65, no. 5, pp. 1671-1677 (May 2016); Nannarelli, A., "Radix-16 Combined Division and Square Root Unit," 20th *IEEE Symposium on Computer Arithmetic*, pp. 169-176 (July 2011); U.S. Pat. No. 7,185,040 to Lee; and U.S. Pat. No. 7,809,784 to Lee, all of which are incorporated by reference herein in their entireties.

The initial divisor D and dividend PR[0] are shown as input at the top of FIG. 5. According to embodiments of the present disclosure, the $bias_0$ of the entry/cell corresponding to the divisor D and dividend PR[0] is determined at 505. More specifically, it is determined whether the initial D/PR[0] falls inside or outside the +/−r4 region in FIG. 4. If it falls within the +/−r4 region of FIG. 4, there will be no $bias_0$ to apply during the division/square root operation.

As mentioned above, when performing square root operations, there is no divisor D and another value has to be selected to fill in as the initial "divisor." When determining the $bias_0$ from the initial constructed "divisor" value when performing a square root operation to according the present disclosure to in a situation, the same process of determining may take extra steps, as described in the '757 application and above in reference to FIG. 3B.

If the cell entry for the initial D/PR[0] falls outside the +/−r4 region of FIG. 4, there will be a $bias_0$ to apply during the division/square root operation. As shown in FIG. 4, the $bias_0$ if the initial D/PR[0] cell is in the +r8 region is −4D; the $bias_0$ if the initial D/PR[0] cell is in the +r16 region is −8D; the $bias_0$ if the initial D/PR[0] cell is in the −r8 region is +4D; and the $bias_0$ if the initial D/PR[0] cell is in the −r16 region is +8D. Although these are the bias values for this embodiment, in other embodiments according to the present disclosure, other bias values may be selected, as would be understood by one of ordinary skill in this field of technology.

The $bias_O$ determined at the outset of the square root/division operation is used throughout the entirety of the operation, i.e., the same $bias_O$ value is applied in every iteration. More specifically, during each iteration, the 4 MSB of the divisor D are input as the column value for the radix-4 PD table 510. If a $bias_O$ value is determined in 505, the 4 MSB value used in each iteration as the column value is biased by $bias_O$, as indicated by $bias_O$ box 592. Although represent by box 592, the repeated use of the biased or unbiased 4 MSB value may simply be stored for input, rather than being re-"entered" as indicated by FIG. 5, as would be understood by one of ordinary skill in the art as one of the many variations possible in hardware for this function.

However, the updated sign bit (S) and 7 MSB of the current partial radicand PR[j] value would be biased by the $bias_O$ value in every iteration as indicated by box 594, if a $bias_O$ value is determined in 505. The applied $bias_O$ value would also have a positive or negative value. Thus, the values entered as input to the radix-4 PD table 510 being used for radix-16 operations are appropriately biased with a minimum of extra hardware and/or calculation. In this way, the benefits of higher radix operations, such as, e.g., quicker calculations through less iterations, may be achieved without the increased complexity and hardware required to maintain a radix-16 PD table.

Moreover, if a $bias_O$ value is determined in 505, this $bias_O$ value must also be applied to the other PR[j] value input to the CSA 550. As shown in FIG. 5, this may be accomplished in a variety of ways, two of which are shown in FIG. 5, namely, either as its own input to the CSA 550 or being applied to PR[j] before being multiplied by r (or, equivalently for a radix-16 operation, shifted by 4 bits at 540) as indicated by the two dashed boxes 596. The implementations shown in FIG. 5 are by no means limiting to the present disclosure—for example, a hardware architecture may be possible where PR[j] is biased only once, and then that biased PR[j] used in all further calculations. Moreover, as would be understood by one of ordinary skill in the art, the biasing may be split up within the hardware architecture, in the same manner as any of Mux 520, Mux 530, shift-by-4 540 or CSA 550 may be split into two or more components to be implemented in appropriate other locations within the hardware architecture.

Similarly to the two bits stored per iteration in FIG. 2, four bits are saved per iteration in the radix-16 operations of FIG. 5 (even though PR[j] remains in its full value). After partial remainder PR[j+1] is output, and becomes the PR[j] input (555) of the next iteration as shown by the loop in FIG. 5. The loops continue until either PR[j+1]=0 or all of the bit values are filled.

Figure 6:
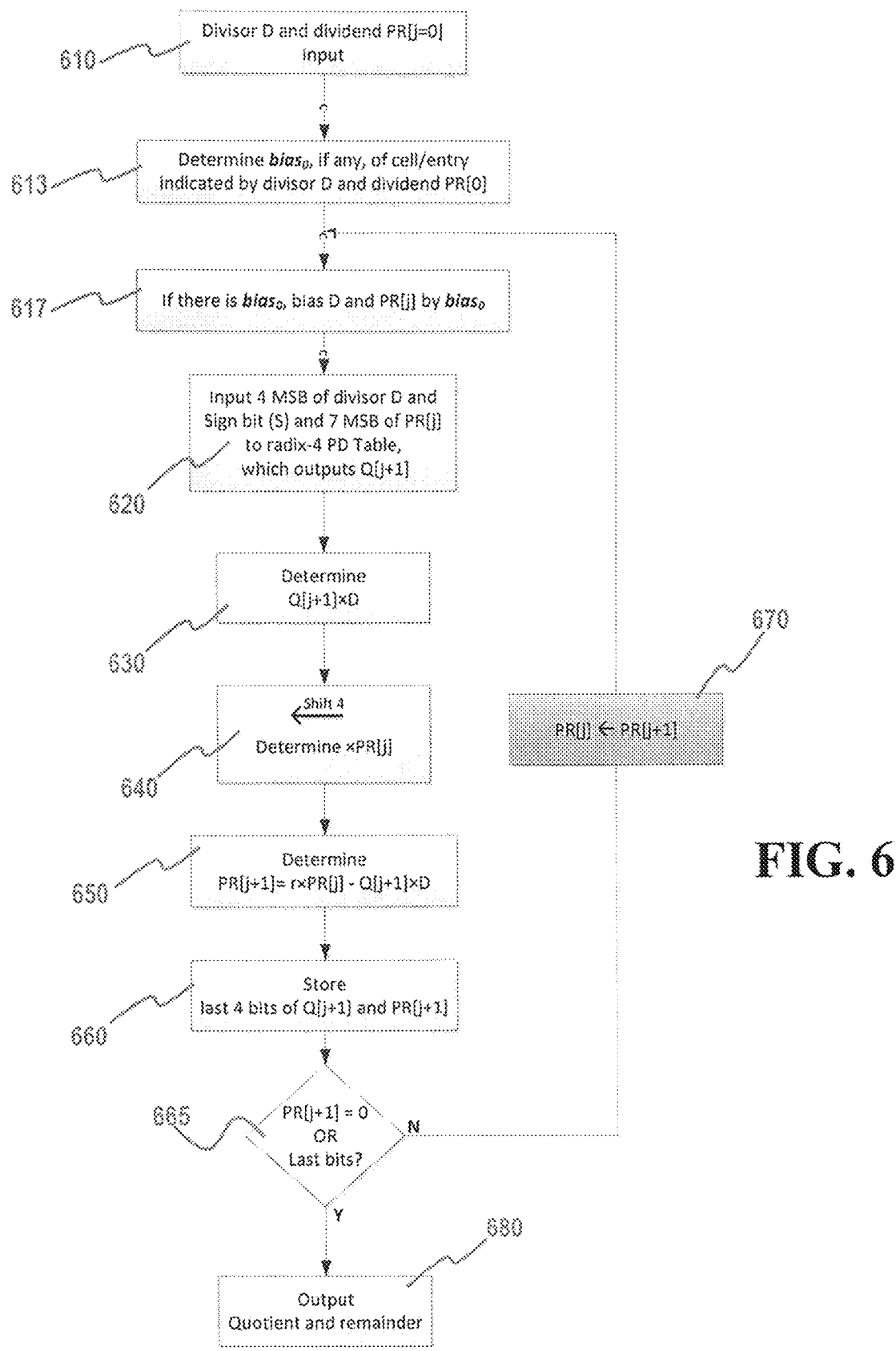
FIG. 6 is a flowchart illustrating a method for performing radix-16 division/square root operations using a radix-4 PD table according to an embodiment of the present invention.

FIG. 6 is a flowchart illustrating a method for performing radix-16 division operations using a radix-4 PD table according to an embodiment of the present invention. The flowchart in FIG. 6 is for illustration purposes only, and the steps shown therein may be performed simultaneously, in a different order, or by indirect means (e.g., using equations that achieve the same final result).

At 610, the divisor D and initial dividend PR[j=0] are input. At 613, the $bias_O$ of the entry/cell corresponding to the divisor D and dividend PR[0] is determined. More specifically, it is determined whether the entry/cell corresponding to the initial D/PR[0] falls inside or outside the +/−r4 region in FIG. 4. If it falls within the +/−r4 region of FIG. 4, there will be no $bias_O$ to apply during the division/square root operation. As mentioned above, when performing square root operations, determining the $bias_O$ from the initial constructed "divisor" value may require extra steps, as described in the '757 application.

If the cell entry for the initial D/PR[0] falls outside the +/−r4 region of FIG. 4, there will be a $bias_O$ to apply during the division/square root operations at 613. As shown in FIG. 4, the $bias_O$ if the initial D/PR[0] cell is in the +r8 region is −4D; the $bias_O$ if the initial D/PR[0] cell is in the +r16 region is −8D; the $bias_O$ if the initial D/PR[0] cell is in the −r8 region is +4D; and the $bias_O$ if the initial D/PR[0] cell is in the −r16 region is +8D.

At 617, the partial remainder PR[j] is biased by $bias_O$, if there is any $bias_O$. At 620, the 4 MSBs of divisor D (either biased or unbiased) are input as a column value to the radix-4 PD table, and the 1 sign bit (S) and 7 MSBs of the partial remainder PR[j] (either biased or unbiased) are input as the row value of the radix-4 PD table. The cell/entry identified by the column indicated by the 4 MSBs of divisor D and the row indicated by the 1 sign bit (S) and 7 MSBs of the partial remainder PR[j] is output as Q[j+1]. At 630, Q[j+1]×D is determined and at 640, r×PR[j] is determined by shifting PR[j] by four bits, which, as discussed above, is equivalent to multiplying by 16 (=radix value).

At 650, the partial remainder is calculated, i.e., PR[j+1] =r×PR[j]−Q[j+1]×D. The last four bits of Q[j+1] and PR[j+1] are stored in 660. At 665, it is determined whether the calculation is finished. More specifically, it is determined whether the current partial remainder is 0 (PR[j+1]=0) or all of the bits of the number have been calculated. If the current partial remainder is 0 (PR[j+1]=0) or all of the bits of the number have been calculated, the final answer is output, i.e., the calculated quotient and remainder at 680.

On the other hand, if the current partial remainder is not 0 (PR[j+1]≠0) and all of the bits of the number have not been calculated in 665, the iterations continue. More specifically, the partial remainder PR[j+1] is shifted four bits at 670, thereby generating the PR[j] input for the next iteration, as indicated by the loop back up above 617 in FIG. 6.

Square root operations would be performed somewhat differently, but with the same biasing operations and use of the radix-4 PD table, as discussed in reference to FIG. 3B and would be understood by one of ordinary skill in the art.

Although the embodiments described in detail herein involve performing radix-16 square root/division operations using a modified radix-4 PD table, the present disclosure is not limited thereto, and may be applied to any higher radix square root/division operations being performed with an appropriately modified lower radix PD table, in accordance with the present disclosure.

Figure 7A:
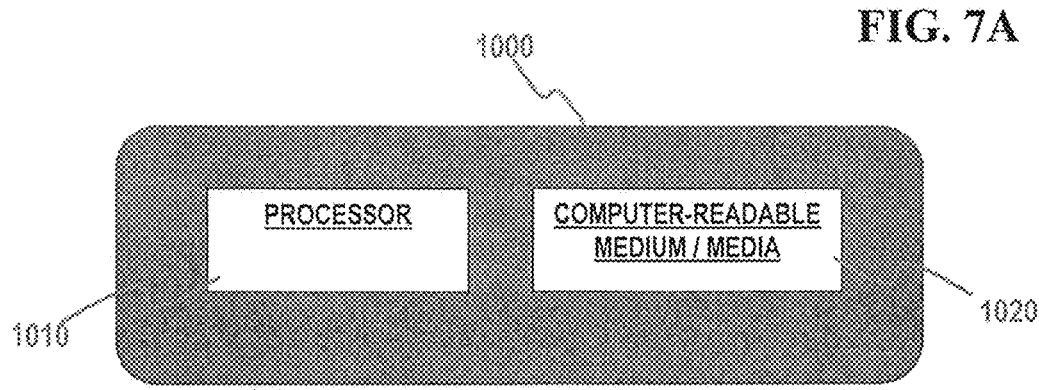
FIG. 7A illustrates an exemplary apparatus according to an embodiment of the present disclosure.

FIG. 7A illustrates an apparatus according to an embodiment of the present disclosure. An apparatus 1000 includes at least one processor 1010 and one or more non-transitory computer readable media 1020. The one or more non-transitory computer-readable media store a partial remainder-divisor (PD) table used in performing recursive operations. The at least one processor 1010, when executing instructions stored on the one or more non-transitory computer readable media 1020, determines whether a current cell in the PD table indicated by a current partial remainder/radicand row value and a current divisor/root column value is outside a primary region of the PD table; and if the current cell is outside the primary region of the PD table, adjusts at least one of the current partial remainder/radicand row value and the current divisor/root column value so that the indicated current cell falls within the primary region of the PD table.

Figure 7B:
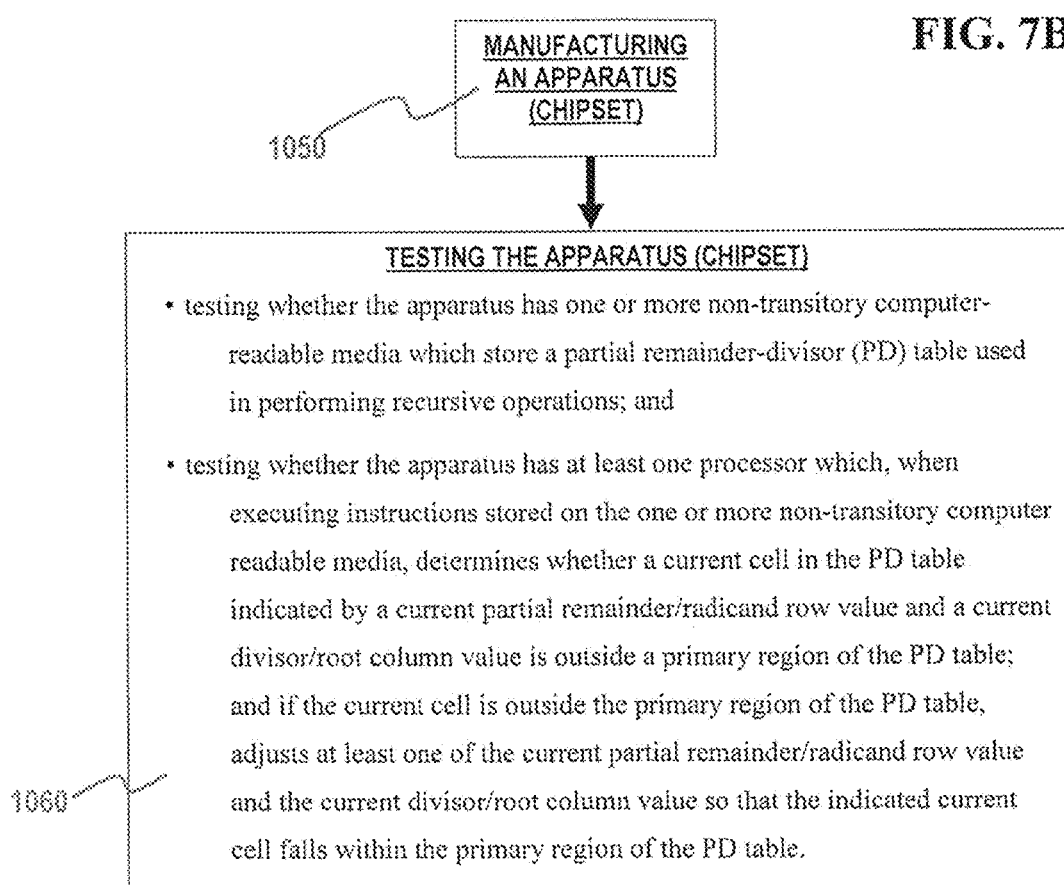
FIG. 7B illustrates a flowchart of an exemplary method for manufacturing and/or testing an apparatus according to an embodiment of the present disclosure.

FIG. 7B illustrates a flowchart of a method for manufacturing and testing an apparatus according to an embodiment of the present disclosure.

At 1050, the apparatus (in this instance, a chipset) is manufactured, including at least one processor and one or more non-transitory computer-readable media. When executing instructions stored on the one or more non-transitory computer readable media, the at least one processor determines whether a current cell in the PD table indicated by a current partial remainder/radicand row value and a current divisor/root column value is outside a primary region of the PD table; and if the current cell is outside the primary region of the PD table, adjusts at least one of the current partial remainder/radicand row value and the current divisor/root column value so that the indicated current cell falls within the primary region of the PD table. The one or more non-transitory computer-readable media store a partial remainder-divisor (PD) table used in performing recursive operations.

At 1060, the apparatus (in this instance, a chipset) is tested. Testing 1060 includes testing whether the apparatus has the one or more non-transitory computer-readable media which store a partial remainder-divisor (PD) table used in performing recursive operations; and testing whether the apparatus has at least one processor, which, when executing instructions stored on one or more non-transitory computer readable media, determines whether a current cell in the PD table indicated by a current partial remainder/radicand row value and a current divisor/root column value is outside a primary region of the PD table; and if the current cell is outside the primary region of the PD table, adjusts at least one of the current partial remainder/radicand row value and the current divisor/root column value so that the indicated current cell falls within the primary region of the PD table.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these are known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method of performing radix-16 division/square root operations using a partial remainder-divisor (PD) table in a microprocessor, comprising:

determining, by a bias determining device, whether a current cell in the PD table indicated by a current partial remainder/radicand row value and a current divisor/root column value is outside a primary region of the PD table;
when the current cell is outside the primary region of the PD table, adjusting, in at least one storage device, at least one of the current partial remainder/radicand row value and the current divisor/root column value so that the indicated current cell falls within the primary region of the PD table; and
inputting, to the PD table, the adjusted at least one of the current partial remainder/radicand row value and the current divisor/root column value to determine a quotient and remainder/radicand of the radix-16 division/square root operation.

2. The method of claim 1, wherein the PD table comprises multiple regions, including the primary region.

3. The method of claim 1, wherein the primary region comprises a foldable radix-4 PD table.

4. The method of claim 1, wherein the microprocessor stores whole cell values for the primary region.

5. The method of claim 1, further comprising, after either determining that the indicated current cell value is not outside the primary region or adjusting at least one of the current partial remainder/radicand row value and the current divisor/root column value so that the indicated current cell falls within the primary region of the PD table:
performing the recursive operations using the current cell value.

6. The method of claim 1, wherein the recursive operations using the PD table are at least square root and division calculation.

7. The method of claim 1, wherein the primary region is based on the following table:

|         | Divisor/ROOT | | | | | | | | | | | | | | | | |
|---------|------|------|------|------|------|------|------|------|------|------|------|------|------|------|------|------|------|
|         | 0000 | 0001 | 0010 | 0011 | 0100 | 0101 | 0110 | 0111 | 1000 | 1001 | 1010 | 1011 | 1100 | 1101 | 1110 | 1111 |      |
| 0101.01 | X | X | X | X | X | X | X | X | X | X | X | X | X | X | X | X | +5.25 |
| 0101.00 | X | X | X | X | X | X | X | X | X | X | X | X | X | X | X | 01 | +5.00 |
| 0100.11 | X | X | X | X | X | X | X | X | X | X | X | X | X | 01 | 01 | 01 | +4.75 |
| 0100.10 | X | X | X | X | X | X | X | X | X | X | X | X | 01 | 01 | 01 | 01 | +4.50 |
| 0100.01 | X | X | X | X | X | X | X | X | X | X | 01 | 01 | 01 | 01 | 01 | 01 | +4.25 |
| 0100.00 | X | X | X | X | X | X | X | X | 01 | 01 | 01 | 01 | 01 | 01 | 01 | 01 | +4.00 |
| 0011.11 | X | X | X | X | X | X | X | 01 | 01 | 01 | 01 | 01 | 01 | 01 | 01 | 01 | +3.75 |
| 0011.10 | X | X | X | X | X | X | 01 | 01 | 01 | 01 | 01 | 01 | 01 | 01 | 01 | 01 | +3.50 |
| 0011.01 | X | X | X | X | 01 | 01 | 01 | 01 | 01 | 01 | 01 | 01 | 01 | 01 | 01 | 01 | +3.25 |
| 0011.00 | X | X | X | 01 | 01 | 01 | 01 | 01 | 01 | 01 | 01 | 01 | 01 | 01 | 01 | 01 | +3.00 |
| 0010.11 | X | 01 | 01 | 01 | 01 | 01 | 01 | 01 | 01 | 01 | 01 | 01 | 01 | 01 | 01 | 01 | +2.75 |
| 0010.10 | 01 | 01 | 01 | 01 | 01 | 01 | 01 | 01 | 01 | 01 | 01 | 01 | 01 | 10 | 10 | 10 | +2.50 |
| 0010.01 | 01 | 01 | 01 | 01 | 01 | 01 | 01 | 01 | 01 | 10 | 10 | 10 | 10 | 10 | 10 | 10 | +2.25 |
| 0010.00 | 01 | 01 | 01 | 01 | 01 | 01 | 01 | 10 | 10 | 10 | 10 | 10 | 10 | 10 | 10 | 10 | +2.00 |
| 0001.11 | 01 | 01 | 01 | 01 | 01 | 10 | 10 | 10 | 10 | 10 | 10 | 10 | 10 | 10 | 10 | 10 | +1.75 |
| 0001.10 | 01 | 01 | 10 | 10 | 10 | 10 | 10 | 10 | 10 | 10 | 10 | 10 | 10 | 10 | 10 | 10 | +1.50 |
| 0001.01 | 10 | 10 | 10 | 10 | 10 | 10 | 10 | 10 | 10 | 10 | 10 | 10 | 10 | 10 | 10 | 10 | +1.25 |
| 0001.00 | 10 | 10 | 10 | 10 | 10 | 10 | 10 | 10 | 10 | 10 | 10 | 10 | 10 | 10 | 10 | 10 | +1.00 |
| 0000.11 | 10 | 10 | 10 | 10 | 10 | 10 | 10 | 10 | 10 | 10 | 10 | 10 | 10 | 10 | 10 | 10 | +0.75 |
| 0000.10 | 10 | 10 | 10 | 10 | 10 | 10 | 00 | 00 | 00 | 00 | 00 | 00 | 00 | 00 | 00 | 00 | +0.50 |
| 0000.01 | 00 | 00 | 00 | 00 | 00 | 00 | 00 | 00 | 00 | 00 | 00 | 00 | 00 | 00 | 00 | 00 | +0.25 |
| 0000.00 | 00 | 00 | 00 | 00 | 00 | 00 | 00 | 00 | 00 | 00 | 00 | 00 | 00 | 00 | 00 | 00 | +0.00 |
|         | 0 | 1 | 2 | 3 | 4 | 5 | 6 | 7 | 8 | 9 | 10 | 11 | 12 | 13 | 14 | 15 |      |
| 1111.11 | 00 | 00 | 00 | 00 | 00 | 00 | 00 | 00 | 00 | 00 | 09 | 00 | 00 | 00 | 00 | 00 | −0.25 |
| 1111.10 | 00 | 00 | 00 | 00 | 00 | 00 | 00 | 00 | 00 | 00 | 00 | 00 | 00 | 00 | 00 | 00 | −0.50 |
| 1111.01 | 10 | 10 | 10 | 10 | 10 | 10 | 00 | 00 | 00 | 00 | 00 | 00 | 00 | 00 | 00 | 00 | −0.75 |
| 1111.00 | 10 | 10 | 10 | 10 | 10 | 10 | 10 | 10 | 10 | 10 | 10 | 10 | 10 | 10 | 10 | 10 | −1.00 |
| 1110.11 | 10 | 10 | 10 | 10 | 10 | 10 | 10 | 10 | 10 | 10 | 10 | 10 | 10 | 10 | 10 | 10 | −1.25 |
| 1110.10 | 10 | 10 | 10 | 10 | 10 | 10 | 10 | 10 | 10 | 10 | 10 | 10 | 10 | 10 | 10 | 10 | −1.50 |
| 1110.01 | 01 | 01 | 10 | 10 | 10 | 10 | 10 | 10 | 10 | 10 | 10 | 10 | 10 | 10 | 10 | 10 | −1.75 |
| 1110.00 | 01 | 01 | 01 | 01 | 10 | 10 | 10 | 10 | 10 | 10 | 10 | 10 | 10 | 10 | 10 | 10 | −2.00 |
| 1101.11 | 01 | 01 | 01 | 01 | 01 | 10 | 10 | 10 | 10 | 10 | 10 | 10 | 10 | 10 | 10 | 10 | −2.25 |
| 1101.10 | 01 | 01 | 01 | 01 | 01 | 01 | 01 | 01 | 01 | 10 | 10 | 10 | 10 | 10 | 10 | 10 | −2.50 |
| 1101.01 | 01 | 01 | 01 | 01 | 01 | 01 | 01 | 01 | 01 | 01 | 01 | 01 | 10 | 10 | 10 | 10 | −2.75 |
| 1101.00 | 01 | 01 | 01 | 01 | 01 | 01 | 01 | 01 | 01 | 01 | 01 | 01 | 01 | 01 | 01 | 01 | −3.00 |
| 1100.11 | X | X | X | 01 | 01 | 01 | 01 | 01 | 01 | 01 | 01 | 01 | 01 | 01 | 01 | 01 | −3.25 |
| 1100.10 | X | X | X | X | 01 | 01 | 01 | 01 | 01 | 01 | 01 | 01 | 01 | 01 | 01 | 01 | −3.50 |
| 1100.01 | X | X | X | X | X | X | 01 | 01 | 01 | 01 | 01 | 01 | 01 | 01 | 01 | 01 | −3.75 |
| 1100.00 | X | X | X | X | X | X | X | 01 | 01 | 01 | 01 | 01 | 01 | 01 | 01 | 01 | −4.00 |
| 1011.11 | X | X | X | X | X | X | X | X | 01 | 01 | 01 | 01 | 01 | 01 | 01 | 01 | −4.25 |
| 1011.10 | X | X | X | X | X | X | X | X | X | X | 01 | 01 | 01 | 01 | 01 | 01 | −4.50 |
| 1011.01 | X | X | X | X | X | X | X | X | X | X | X | X | 01 | 01 | 01 | 01 | −4.75 |
| 1011.00 | X | X | X | X | X | X | X | X | X | X | X | X | X | 01 | 01 | 01 | −5.00 |
| 1010.11 | X | X | X | X | X | X | X | X | X | X | X | X | X | X | X | 01 | −5.25 |
| 1010.10 | X | X | X | X | X | X | X | X | X | X | X | X | X | X | X | X | −5.50 |
|         | 0000 | 0001 | 0010 | 0011 | 0100 | 0101 | 0110 | 0111 | 1000 | 1001 | 1010 | 1011 | 1100 | 1101 | 1110 | 1111 |      |
|         | Divisor/ROOT. | | | | | | | | | | | | | | | | |

8. The method of claim 7, wherein the radix-4 region is modified to be foldable, further comprising:
adjusting cell values modified in order to make the radix-4 region foldable back to their original values when performing any operations using them.

9. The method of claim 1, wherein the primary region is modified to be foldable, and the PD table has the format of the following:
   regions first "don't care," D +r16, +r8, +r4, A −r4, C −r8, −r16, and second "don't care,"
   wherein the first "don't care" region mirrors the second "don't care" region with respect to a first coordinate axis,
   wherein region D +r16 mirrors region −r16 with respect to the first coordinate axis,
   wherein region +r8 mirrors region C −r8 with respect to the first coordinate axis,
   wherein region +r4 mirrors region A −r4 with respect to the first coordinate axis,
   wherein region D +r16 intermediates the first "don't care" region and region +r8,
   wherein region +r8 intermediates region D +r16 and region +r4,
   wherein region C −r8 intermediates region A −r4 and region −r16,
   wherein region −r16 intermediates region C −r8 and the second "don't care" region,
   and wherein the +r4 and A −r4 regions comprise the primary region.

10. The method of claim 9, wherein +r8 and −r8 regions correspond to the additional cells needed for a complete radix-8 PD table and +r16 and −r16 regions correspond to the additional cells needed for a complete radix-16 PD table, and wherein the values for the cells in the +r8 and −r8 regions and the +r16 and −r16 regions are not stored.

11. An apparatus, comprising:
   a partial remainder-divisor (PD) table configured to perform recursive operations; and
   a bias determining device configured to determine whether a current cell in the PD table indicated by a current partial remainder/radicand row value and a current divisor/root column value is outside a primary region of the PD table; and
   at least one storage device configured to, when the current cell is outside the primary region of the PD table, store an adjusted at least one of the current partial remainder/radicand row value and the current divisor/root column value so that the indicated current cell falls within the primary region of the PD table,
   wherein the PD table is further configured to receive the adjusted at least one of the current partial remainder/radicand row value and the current divisor/root column value to determine a quotient and remainder/radicand of the radix-16 division/square root operation.

12. The apparatus of claim 11, wherein the primary region is foldable and one of negative or non-negative cell values is stored.

13. The apparatus of claim 11, wherein whole cell values are stored for the primary region.

14. The apparatus of claim 11, wherein the recursive operations performed using the PD table are at least square root and division calculation.

15. The apparatus of claim 11, wherein the primary region is based on the following table:

| | | | | | | | | Divisor/ROOT | | | | | | | | | |
|---|---|---|---|---|---|---|---|---|---|---|---|---|---|---|---|---|---|
| | 0000 | 0001 | 0010 | 0011 | 0100 | 0101 | 0110 | 0111 | 1000 | 1001 | 1010 | 1011 | 1100 | 1101 | 1110 | 1111 | |
| 0101.01 | X | X | X | X | X | X | X | X | X | X | X | X | X | X | X | X | +5.25 |
| 0101.00 | X | X | X | X | X | X | X | X | X | X | X | X | X | X | X | 01 | +5.00 |
| 0100.11 | X | X | X | X | X | X | X | X | X | X | X | X | X | 01 | 01 | 01 | +4.75 |
| 0100.10 | X | X | X | X | X | X | X | X | X | X | X | X | 01 | 01 | 01 | 01 | +4.50 |
| 0100.01 | X | X | X | X | X | X | X | X | X | X | 01 | 01 | 01 | 01 | 01 | 01 | +4.25 |
| 0100.00 | X | X | X | X | X | X | X | X | 01 | 01 | 01 | 01 | 01 | 01 | 01 | 01 | +4.00 |
| 0011.11 | X | X | X | X | X | X | X | 01 | 01 | 01 | 01 | 01 | 01 | 01 | 01 | 01 | +3.75 |
| 0011.10 | X | X | X | X | X | 01 | 01 | 01 | 01 | 01 | 01 | 01 | 01 | 01 | 01 | 01 | +3.50 |
| 0011.01 | X | X | X | X | 01 | 01 | 01 | 01 | 01 | 01 | 01 | 01 | 01 | 01 | 01 | 01 | +3.25 |
| 0011.00 | X | X | X | 01 | 01 | 01 | 01 | 01 | 01 | 01 | 01 | 01 | 01 | 01 | 01 | 01 | +3.00 |
| 0010.11 | X | 01 | 01 | 01 | 01 | 01 | 01 | 01 | 01 | 01 | 01 | 01 | 01 | 01 | 01 | 01 | +2.75 |
| 0010.10 | 01 | 01 | 01 | 01 | 01 | 01 | 01 | 01 | 01 | 01 | 01 | 01 | 01 | 01 | 10 | 10 | +2.50 |
| 0010.01 | 01 | 01 | 01 | 01 | 01 | 01 | 01 | 01 | 01 | 01 | 10 | 10 | 10 | 10 | 10 | 10 | +2.25 |
| 0010.00 | 01 | 01 | 01 | 01 | 01 | 01 | 01 | 10 | 10 | 10 | 10 | 10 | 10 | 10 | 10 | 10 | +2.00 |
| 0001.11 | 01 | 01 | 01 | 01 | 01 | 10 | 10 | 10 | 10 | 10 | 10 | 10 | 10 | 10 | 10 | 10 | +1.75 |
| 0001.10 | 01 | 01 | 10 | 10 | 10 | 10 | 10 | 10 | 10 | 10 | 10 | 10 | 10 | 10 | 10 | 10 | +1.50 |
| 0001.01 | 10 | 10 | 10 | 10 | 10 | 10 | 10 | 10 | 10 | 10 | 10 | 10 | 10 | 10 | 10 | 10 | +1.25 |
| 0001.00 | 10 | 10 | 10 | 10 | 10 | 10 | 10 | 10 | 10 | 10 | 10 | 10 | 10 | 10 | 10 | 10 | +1.00 |
| 0000.11 | 10 | 10 | 10 | 10 | 10 | 10 | 10 | 10 | 10 | 10 | 10 | 10 | 10 | 10 | 10 | 10 | +0.75 |
| 0000.10 | 10 | 10 | 10 | 10 | 10 | 10 | 00 | 00 | 00 | 00 | 00 | 00 | 00 | 00 | 00 | 00 | +0.50 |
| 0000.01 | 00 | 00 | 00 | 00 | 00 | 00 | 00 | 00 | 00 | 00 | 00 | 00 | 00 | 00 | 00 | 00 | +0.25 |
| 0000.00 | 00 | 00 | 00 | 00 | 00 | 00 | 00 | 00 | 00 | 00 | 00 | 00 | 00 | 00 | 00 | 00 | +0.00 |
| | 0 | 1 | 2 | 3 | 4 | 5 | 6 | 7 | 8 | 9 | 10 | 11 | 12 | 13 | 14 | 15 | |
| 1111.11 | 00 | 00 | 00 | 00 | 00 | 00 | 00 | 00 | 00 | 00 | 00 | 00 | 00 | 00 | 00 | 00 | −0.25 |
| 1111.10 | 00 | 00 | 00 | 00 | 00 | 00 | 00 | 00 | 00 | 00 | 00 | 00 | 00 | 00 | 00 | 00 | −0.50 |
| 1111.01 | 10 | 10 | 10 | 10 | 10 | 10 | 00 | 00 | 00 | 00 | 00 | 00 | 00 | 00 | 00 | 00 | −0.75 |
| 1111.00 | 10 | 10 | 10 | 10 | 10 | 10 | 10 | 10 | 10 | 10 | 10 | 10 | 10 | 10 | 10 | 10 | −1.00 |
| 1110.11 | 10 | 10 | 10 | 10 | 10 | 10 | 10 | 10 | 10 | 10 | 10 | 10 | 10 | 10 | 10 | 10 | −1.25 |
| 1110.10 | 10 | 10 | 10 | 10 | 10 | 10 | 10 | 10 | 10 | 10 | 10 | 10 | 10 | 10 | 10 | 10 | −1.50 |
| 1110.01 | 01 | 01 | 10 | 10 | 10 | 10 | 10 | 10 | 10 | 10 | 10 | 10 | 10 | 10 | 10 | 10 | −1.75 |
| 1110.00 | 01 | 01 | 01 | 01 | 10 | 10 | 10 | 10 | 10 | 10 | 10 | 10 | 10 | 10 | 10 | 10 | −2.00 |
| 1101.11 | 01 | 01 | 01 | 01 | 10 | 10 | 10 | 10 | 10 | 10 | 10 | 10 | 10 | 10 | 10 | 10 | −2.25 |
| 1101.10 | 01 | 01 | 01 | 01 | 01 | 01 | 01 | 01 | 01 | 10 | 10 | 10 | 10 | 10 | 10 | 10 | −2.50 |
| 1101.01 | 01 | 01 | 01 | 01 | 01 | 01 | 01 | 01 | 01 | 01 | 01 | 01 | 01 | 10 | 10 | 10 | −2.75 |
| 1101.00 | 01 | 01 | 01 | 01 | 01 | 01 | 01 | 01 | 01 | 01 | 01 | 01 | 01 | 01 | 01 | 01 | −3.00 |
| 1100.11 | X | X | X | 01 | 01 | 01 | 01 | 01 | 01 | 01 | 01 | 01 | 01 | 01 | 01 | 01 | −3.25 |
| 1100.10 | X | X | X | X | 01 | 01 | 01 | 01 | 01 | 01 | 01 | 01 | 01 | 01 | 01 | 01 | −3.50 |

-continued

| | 0000 | 0001 | 0010 | 0011 | 0100 | 0101 | 0110 | 0111 | 1000 | 1001 | 1010 | 1011 | 1100 | 1101 | 1110 | 1111 | |
|---|---|---|---|---|---|---|---|---|---|---|---|---|---|---|---|---|---|
| 1100.01 | X | X | X | X | X | X | 01 | 01 | 01 | 01 | 01 | 01 | 01 | 01 | 01 | 01 | −3.75 |
| 1100.00 | X | X | X | X | X | X | X | 01 | 01 | 01 | 01 | 01 | 01 | 01 | 01 | 01 | −4.00 |
| 1011.11 | X | X | X | X | X | X | X | X | 01 | 01 | 01 | 01 | 01 | 01 | 01 | 01 | −4.25 |
| 1011.10 | X | X | X | X | X | X | X | X | X | X | 01 | 01 | 01 | 01 | 01 | 01 | −4.50 |
| 1011.01 | X | X | X | X | X | X | X | X | X | X | X | X | 01 | 01 | 01 | 01 | −4.75 |
| 1011.00 | X | X | X | X | X | X | X | X | X | X | X | X | X | 01 | 01 | 01 | −5.00 |
| 1010.11 | X | X | X | X | X | X | X | X | X | X | X | X | X | X | X | 01 | −5.25 |
| 1010.10 | X | X | X | X | X | X | X | X | X | X | X | X | X | X | X | X | −5.50 |

Divisor/ROOT.

16. The apparatus of claim 15, wherein the radix-4 region is modified to be foldable, and
wherein the at least one processor, when executing instructions stored on the one or more non-transitory computer readable media for performing recursive operations, performs the step of:
adjusting cell values modified in order to make the radix-4 region foldable back to their original values when performing any operations using them.

17. The apparatus of claim 11, wherein the primary region is modified to be foldable, and the PD table has the format of the following:
regions first "don't care," D +r16, +r8, +r4, A −r4, C −r8, −r16, and second "don't care,"
wherein the first "don't care" region mirrors the second "don't care" region with respect to a first coordinate axis,
wherein region D +r16 mirrors region −r16 with respect to the first coordinate axis,
wherein region +r8 mirrors region C −r8 with respect to the first coordinate axis,
wherein region +r4 mirrors region A −r4 with respect to the first coordinate axis,
wherein region D +r16 intermediates the first "don't care" region and region +r8,
wherein region +r8 intermediates region D +r16 and region +r4,
wherein region C −r8 intermediates region A −r4 and region −r16,
wherein region −r16 intermediates region C −r8 and the second "don't care" region, and wherein the +r4 and A −r4 regions comprise the primary region.

18. The apparatus of claim 17, wherein +r8 and −r8 regions correspond to the additional cells needed for a complete radix-8 PD table and +r16 and −r16 regions correspond to the additional cells needed for a complete radix-16 PD table, and
wherein the values for the cells in the +r8 and −r8 regions and the +r16 and −r16 regions are not stored.

19. A method, comprising:
manufacturing a chipset comprising:
a partial remainder-divisor (PD) table configured to perform recursive operations; and
a bias determining device configured to determine whether a current cell in the PD table indicated by a current partial remainder/radicand row value and a current divisor/root column value is outside a primary region of the PD table; and
at least one storage device configured to, when the current cell is outside the primary region of the PD table, store an adjusted at least one of the current partial remainder/radicand row value and the current divisor/root column value so that the indicated current cell falls within the primary region of the PD table,
wherein the PD table is further configured to receive the adjusted at least one of the current partial remainder/radicand row value and the current divisor/root column value to determine a quotient and remainder/radicand of the radix-16 division/square root operation.

20. A method of testing an apparatus, comprising:
testing whether the apparatus includes a partial remainder-divisor (PD) table configured to perform recursive operations; includes
a bias determining device configured to determine whether a current cell in the PD table indicated by a current partial remainder/radicand row value and a current divisor/root column value is outside a primary region of the PD table; and
at least one storage device configured to, when the current cell is outside the primary region of the PD table, storing an adjusted at least one of the current partial remainder/radicand row value and the current divisor/root column value so that the indicated current cell falls within the primary region of the PD table,
wherein the PD table is further configured to receive the adjusted at least one of the current partial remainder/radicand row value and the current divisor/root column value to determine a quotient and remainder/radicand of the radix-16 division/square root operation.

* * * * *